United States Patent
Barrenscheen et al.

(10) Patent No.: US 11,539,313 B2
(45) Date of Patent: Dec. 27, 2022

(54) SYSTEM AND METHOD OF SYNCHRONIZING A SWITCHING SIGNAL

(71) Applicant: Infineon Technologies AG, Neubiberg (DE)

(72) Inventors: Jens Barrenscheen, Munich (DE); Matthias Bogus, Munich (DE); Christian Heiling, Graz (AT)

(73) Assignee: Infineon Technologies AG, Neubiberg (DE)

(*) Notice: Subject to any disclaimer, the term of this patent is extended or adjusted under 35 U.S.C. 154(b) by 1065 days.

(21) Appl. No.: 16/003,944

(22) Filed: Jun. 8, 2018

(65) Prior Publication Data

US 2019/0013748 A1  Jan. 10, 2019

Related U.S. Application Data

(60) Provisional application No. 62/529,898, filed on Jul. 7, 2017.

(51) Int. Cl.
| | |
|---|---|
| *H03K 5/00* | (2006.01) |
| *H02P 6/10* | (2006.01) |
| *G06F 1/08* | (2006.01) |
| *H02P 6/15* | (2016.01) |

(52) U.S. Cl.
CPC .................. *H02P 6/10* (2013.01); *G06F 1/08* (2013.01); *H02P 6/15* (2016.02)

(58) Field of Classification Search
CPC ................. H02P 6/10; H02P 6/15; G06F 1/08
USPC ................................... 318/400.13
See application file for complete search history.

(56) References Cited

U.S. PATENT DOCUMENTS

| | | | | |
|---|---|---|---|---|
| 2002/0185926 A1* | 12/2002 | King | ....................... | H02P 6/182 |
| | | | | 310/68 B |
| 2004/0160201 A1* | 8/2004 | Rahman | .................. | H02P 23/06 |
| | | | | 318/41 |
| 2005/0141335 A1* | 6/2005 | Stark | ........................ | G11C 7/22 |
| | | | | 365/233.1 |
| 2012/0041630 A1* | 2/2012 | Yamamoto | ............... | B60K 6/52 |
| | | | | 180/65.265 |
| 2012/0072063 A1* | 3/2012 | Kato | ..................... | B60W 10/26 |
| | | | | 180/65.265 |
| 2014/0002141 A1* | 1/2014 | Barrenscheen | ......... | H02M 1/08 |
| | | | | 327/108 |
| 2014/0115212 A1* | 4/2014 | Kazuno | ............... | G06F 13/4295 |
| | | | | 710/110 |

FOREIGN PATENT DOCUMENTS

| | | |
|---|---|---|
| JP | 2002345252 A | 11/2002 |
| JP | 2003134834 A | 5/2003 |
| JP | 2015188290 A | 10/2015 |
| JP | 2015231264 A | 12/2015 |

* cited by examiner

*Primary Examiner* — Kawing Chan
*Assistant Examiner* — Gabriel Agared
(74) *Attorney, Agent, or Firm* — Slater Matsil, LLP

(57) ABSTRACT

In accordance with an embodiment, a method includes generating a clock signal; generating a switching signal based on the clock signal; generating a synchronization signal having an edge transition corresponding to a predetermined phase of the switching signal; transmitting the synchronization signal to a master controller; receiving a frequency adjustment command from the master controller based on the transmitted synchronization signal; and adjusting a frequency of the clock signal based on the frequency adjustment command.

24 Claims, 14 Drawing Sheets

SYSTEM AND METHOD OF SYNCHRONIZING A SWITCHING SIGNAL

This application claims the benefit of U.S. Provisional Application No. 62/529,898, filed on Jul. 7, 2017, which application is hereby incorporated herein by reference in its entirety.

TECHNICAL FIELD

This disclosure in general relates to electronic circuits and systems, in particular a system and method of synchronizing switching signals.

BACKGROUND

Driver circuits can be used to control devices that generate power, such as switch-mode power supplies, and can be used to control devices that consume power, such as motors. A motor driver can have a controller that generates a pulse-width modulated signal used to produce drive signals for driver switches for different phases of a motor. The pulse-width modulated signal can specify the drive parameters for the motor. The pulse-width modulated signal can be generated based in-part on an internal oscillator of a component. This arrangement is suitable where there is one motor in control.

In applications employing redundancy of motors or motor windings where multiple pulse-width modulated signals are used to specify the drive parameters for the redundant windings or motors, if the pulse-width modulated signals are not synchronized torque ripple, vibration, noise, harshness, or the like can result. In some cases, the internal oscillators of multiple drive components, on which a pulse-width modulated signal is based, can have manufacturing tolerances that can cause two different oscillators to have different frequencies.

A way of synchronizing the internal timing of modules and functions is needed so that the corresponding pulse-width modulated signals are also synchronized in order to synchronize control of redundant motor systems.

SUMMARY

In accordance with an embodiment, a method includes generating a clock signal; generating a switching signal based on the clock signal; generating a synchronization signal having an edge transition corresponding to a predetermined phase of the switching signal; transmitting the synchronization signal to a master controller; receiving a frequency adjustment command from the master controller based on the transmitted synchronization signal; and adjusting a frequency of the clock signal based on the frequency adjustment command.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
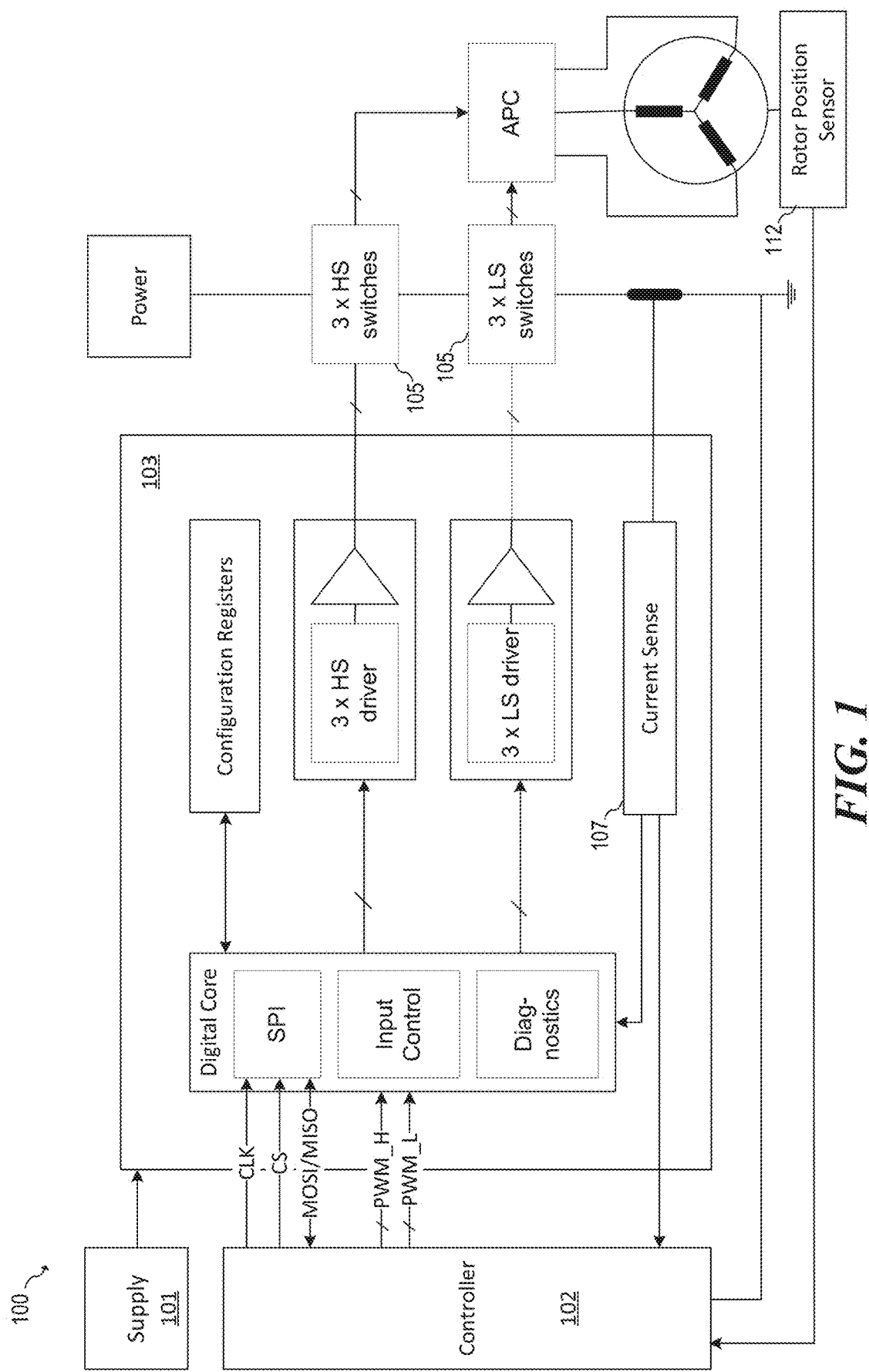
FIG. 1 illustrates a block diagram of an exemplary motor control system.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for controlling at least one motor. The invention may also be applied to other circuits that utilize synchronized clocks such as.

In embodiments of the present invention, PWM motor control signals of a plurality of motors are synchronized by a master controller by monitoring synchronization signals generated by slave motor controllers and by adjusting the frequency of a local clock in the slave motor controllers. The control of the local clock frequencies may be performed independently of the control of the PWM motor control signals. The master controller and each slave motor controller may independently perform a plausibility check on the operation of the motor control system and shut down the motor in the case of a detected system failure. For example, the slave controller may sense a system failure if an expected command signal is not received within a predetermined period of time. Similarly, the master controller may sense a system failure if a synchronization signal is not received from the slave motor controller within a predetermined period of time. If either the master controller or the slave motor controller determines that a system failure has occurred, the master controller or the slave motor controller may shut down the motor. In some embodiments, the synchronization of the PWM motor control signals advantageously results in non-overlapping drive currents to multiple motors.

In embodiments of the present invention, the timing of other circuits and systems may be synchronized to the timing of the PWM motor control signals. Such circuits and systems may include, for example, measurement units configured to measure the rotor position of the motor, the DC-Link voltage or motor currents. In various embodiments, the ability to synchronize measurements may provide the ability to reduce or minimize measurement errors due to phase shifts between the measured values, and/or minimize or reduce the occurrence of invalid measurements. Such measurement units may be located in the slave motor controller, the master controller, or may be partitioned in other portions of the system. In some embodiments, the operation of the measurement units may be directly controlled by the master device, the slave device or a combination of the master device and the slave device.

FIG. 1 illustrates an exemplary three-phase motor drive controller circuit 100. Circuit 100, for example, can be used to operate an electronic power steering system in an automobile. Circuit 100 includes several modules, including a supply IC 101, controller 102, pre-driver IC 103, and electronic power switches 105, such as field effect transistors (FETs). Power switches 105 are the high side and low side switches for controlling phase-by-phase power to three phase motor 104, with one high side and one low side switch for each phase. Pre-driver IC 103 has several logical blocks inside, such as a digital core block containing a serial peripheral interface (SPI) bus interface, input control logic, and diagnostic functions. A current sense block provides feedback information from the motor through the pre-driver IC 103 and back to controller 102. Configuration registers allow configuration of configurable settings in pre-driver IC 103. The digital core produces two PWM signals (for the high side and low side switches) for each of the three phases, totaling six PWM switching signals provided by way of three half-bridge drivers, a high side (HS) and low side ("LS") driver for each half-bridge driver. One of ordinary skill in the art would understand that other connections and functions can exist within the diagram of FIG. 1.

In circuit 100, controller 102 provides motor control via pulse width modulated signals PWM_H and PWM_L for each phase of the motor based on feedback from current sense circuit 107 of pre-driver IC 103. Controller 102 can also operate as the bus master for the SPI bus. In an operation, controller 102 receives input that determines a desired speed and direction to operate motor 104. The input on which the PWM signals are based can be, for example, an input telling controller 102 to speed up the motor, slow down the motor, stop the motor, reverse direction of the motor, set the speed of the motor to a particular speed and direction, and so forth. For example, in the system of FIG. 1, the input can be determined from a position sensor on a steering wheel shaft. PWM signals are created by controller 102 based on the input and based on the current condition and state of the motor, the PWM signals being created to change the state of the motor from a first state to a second state, where the second state is a state that is closer to a targeted state of the motor.

In various embodiments, the generation of the PWM_L and PWM_H signals also depends on the rotor position of the motor. Accordingly, a rotor position sensor 112 is coupled to the motor and delivers information about the actual rotor position of the motor to controller 102.

In various embodiments, motor drive systems can be adapted to driving two or more motors. For example, in an automotive power steering system, it is common to use more than one motor in order to provide redundancy in case of the failure of one of the motors. In some applications, motors operate simultaneously to help steer the automobile. The strengths of the motors can be configured, for example, to work together. In some embodiments, each motor is capable of providing approximately 70% of the total power needed to steer the automobile. In an embodiment of the present invention, the pulse width modulated signals used to drive each of the motors are synchronized with each other. In some cases, these PWM signals are synchronized in a way such that current is delivered to one motor at a time in order to prevent or reduce the peak current being delivered by the HS and LS drivers and the maximum current ripple supplied to the HS and LS drivers.

Figure 2:
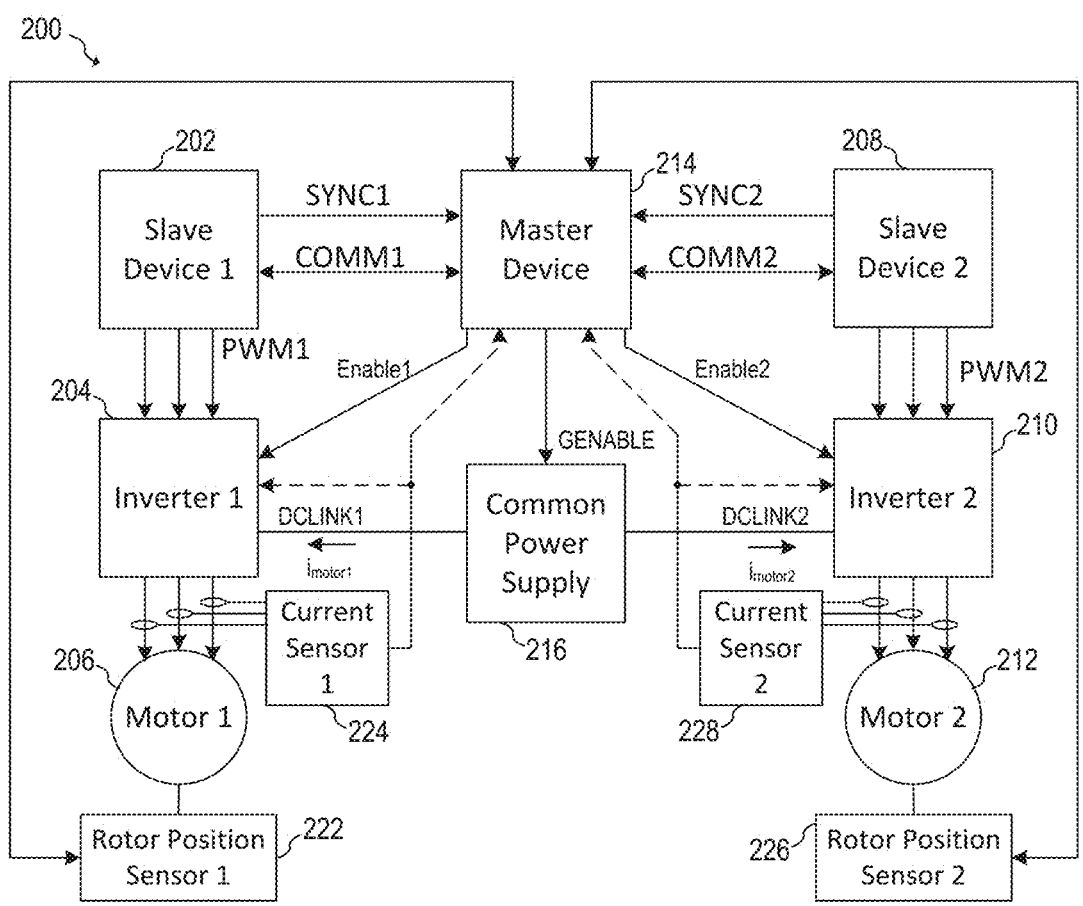
FIG. 2 illustrates a block diagram of an embodiment motor drive system.

FIG. 2 illustrates an embodiment motor drive system 200 in which a single master controller 214 is used to synchronize to slave motor drivers 202 and 208. By synchronizing slave motor drivers 202 and 208 in a manner that delivers current to motors 206 and 212 in an alternating fashion, a common power supply 216 can be used. Using a common power supply to supply DC current to two motors in which current is being driven in an alternating manner, the maximum supply current ripple can be minimized. As such, motor drive system 200 can be configured to provide power and to control multiple motors in a space efficient and cost efficient manner. Space and cost efficiencies can be achieved by using a single common power supply 216 and partitioning various control functions for both motors within master device 214.

As shown, embodiment motor drive system 200 includes master device 214 that controls slave motor drivers 202 and 208. Each of slave motor drivers 202 and 208 provide PWM signals PWM1 and PWM2 to respective inverter circuits 204 and 210. Each of inverter circuits 204 and 210 may include, for example, three half-bridge circuits used to provide power and control to motors 206 and 212. Accordingly, inverter circuits 204 and 210 may also be referred to as switching circuits. Power to respective inverters 204 and 210 is provided using DC power bus DCLINK1 that provides current $i_{motor1}$ to motor 206 and DC power bus DCLINK2 that provides current $i_{motor2}$ to motor 212.

In various embodiments, rotor position sensors 222 and 226 measure the rotor position of motors 206 and 212, respectively, and provide the position measurements to master device 214. In some embodiments, rotor position sensors 222 and 226 provide an analog signal, such as a current or voltage indicative of the rotor positions of motors 206 and 212, and master device 214 samples these analog signals. Alternatively, rotor position sensors 222 and 226 provide a digital signal representative of the rotor positions of motors 206 and 212 that is sampled locally within rotor position sensors 222 and 226. Similarly, current sensors 224 and 228 are configured to measure the drive current provided to motors 206 and 212, respectively. In some embodiments, current sensors 224 and 228 provide an analog signal, such as a current or voltage indicative of the drive current provided to motors 206 and 212, and master device 214 samples these analog signals. Alternatively, current sensors 224 and 228 provide a digital signal representative of the drive current provided to motors 206 and 212 that is sampled locally within current sensors 224 and 228 and/or within inverter 204. In locally sampled embodiments, an analog measurement may be provided to inverters 204 and 210 or to slave devices 202 and 208 and sampled and converted to the digital domain within respective inverter 204 and 210 or slave device 202 and 208. The resulting digital measurement is then transmitted to master device 214 via the interface buses COMM1 and COMM2 coupled to slave devices 202 and 208, respectively. Rotor position sensors 222 and 226 may be implemented using rotor position sensing circuits and systems known in the art. Similarly, current sensors 224 and 228 may be implemented using current sensor circuit and systems known in the art.

During operation, master device 214 synchronizes PWM signals PWM1 and PWM2 produced by slave motor drivers 202 and 208 by monitoring respective synchronization signals SYNC1 and SYNC2 produced by slave motor drivers 202 and 208, respectively. Each of synchronization signals SYNC1 and SYNC2 are derived with a predetermined phase relation to the PWM cycle. Master device 214 receives synchronization signals SYNC1 and SYNC2 and causes slave motor drivers 202 and 208 to adjust the frequency of local clock generators until synchronization signals SYNC1 and SYNC2 are in a desired phase relation with a common clock signal. In some embodiments, one edge of a SYNC signal may be generated with a defined phase relation to the PWM signals, whereas the other edge of the SYNC signal may be derived from another event. Such an event may be in relation to a measurement function that is located in the slave device, e.g. the edge is generated when a phase current measurement provided by current sensor 224 or 228 has been finished. In some embodiments, master device 214 provides these clock adjustment signals via communications bus COMM1 to slave motor driver 202 and via communications bus COMM2 to slave motor driver 208.

In some embodiments, the timing and/or sampling of rotor position measurements performed by rotor position sensors 222 and 226 and/or current measurements performed by current sensors 224 and 228 may be established with respect to the timing of PWM signals PWM1 and PWM2 and/or synchronization signals SYNC1 and SYNC2. For example, the measuring and/or sampling of rotor position sensors 222 and 226 and current sensors 224 and 228 may occur at a fixed offset with respect to the rising or falling edge of synchronization signals SYNC1 and SYNC2. In some embodiments, relative timing between the measuring and/or sampling of rotor position sensors 222 and 226 and current sensors 224 228 may be set such that a current measurement occurs at substantially the same time as a corresponding rotor position measurement. The relative timing between the measuring and/or sampling of rotor position sensors 222 and 226 and current sensors 224 228 may be set by adjusting the delay paths of signals that trigger the applicable measurement or sampling operation.

In addition to synchronizing local clocks on slave motor drivers 202 and 208, master device 214 also sends PWM configuration control signals to slave motor drivers 202 and 208. In various embodiments, the determination of the PWM configuration control signals and the synchronization of the local clocks of slave motor drivers 202 and 208 are performed independently, thereby simplifying the control tasks of circuitry of master device 214.

In some embodiments, each of master device 214 and slave motor drivers 202 and 208 perform an independent plausibility check of the current status of motor drive system 200. For example, slave motor driver 202 may be configured to monitor control signals received via communications bus COMM1 and slave motor driver 208 may be configured to monitor control signals received via communications COMM2. If control signals are not received within a predetermined amount of time, the respective slave motor driver 202 or 208 is configured to disable its respective PWM signals PWM1 and PWM2, thereby shutting down respective motors 206 and 212. In some embodiments, slave motor drivers 202 and 208 may be configured to monitor the receipt of certain types of control words being delivered via communication buses COMM1 and COMM2. For example, if slave motor drivers 202 and 208 do not receive a frequency adjustment command within a predetermined period of time, PWM signals PWM1 and PWM2 are shut down. Alternatively, other types of control signals may be monitored.

Similarly, master device 214 also performs its own plausibility check based on the receipt of synchronization signals SYNC1 and SYNC2 received from slave motor drivers 202 and 208. For example, if master device does not receive one or more synchronization signals SYNC1 and SYNC2 within a predetermined period of time, master device 214 may disable motor drive system 200. Master device 214 may disable motor drive system 200 by disabling common power supply 216, by disabling inverters 204 or 210, or a combination thereof. In alternative embodiments, master device 214 may disable motors 206 and 212 using other methods. In further alternative embodiments, slave motor drivers 202 and 208 may be configured to control separate windings on a single motor.

It should be appreciated that each one of master device 214 and slave motor drivers 202 and 208 is configured to perform its own individual plausibility check independent of each other, and is configured to shut down portions of motor system under its control in an independent manner. Accordingly, motor system 200 can be quickly and efficiently shut down in the case of an emergency or system fault.

Figure 3A:
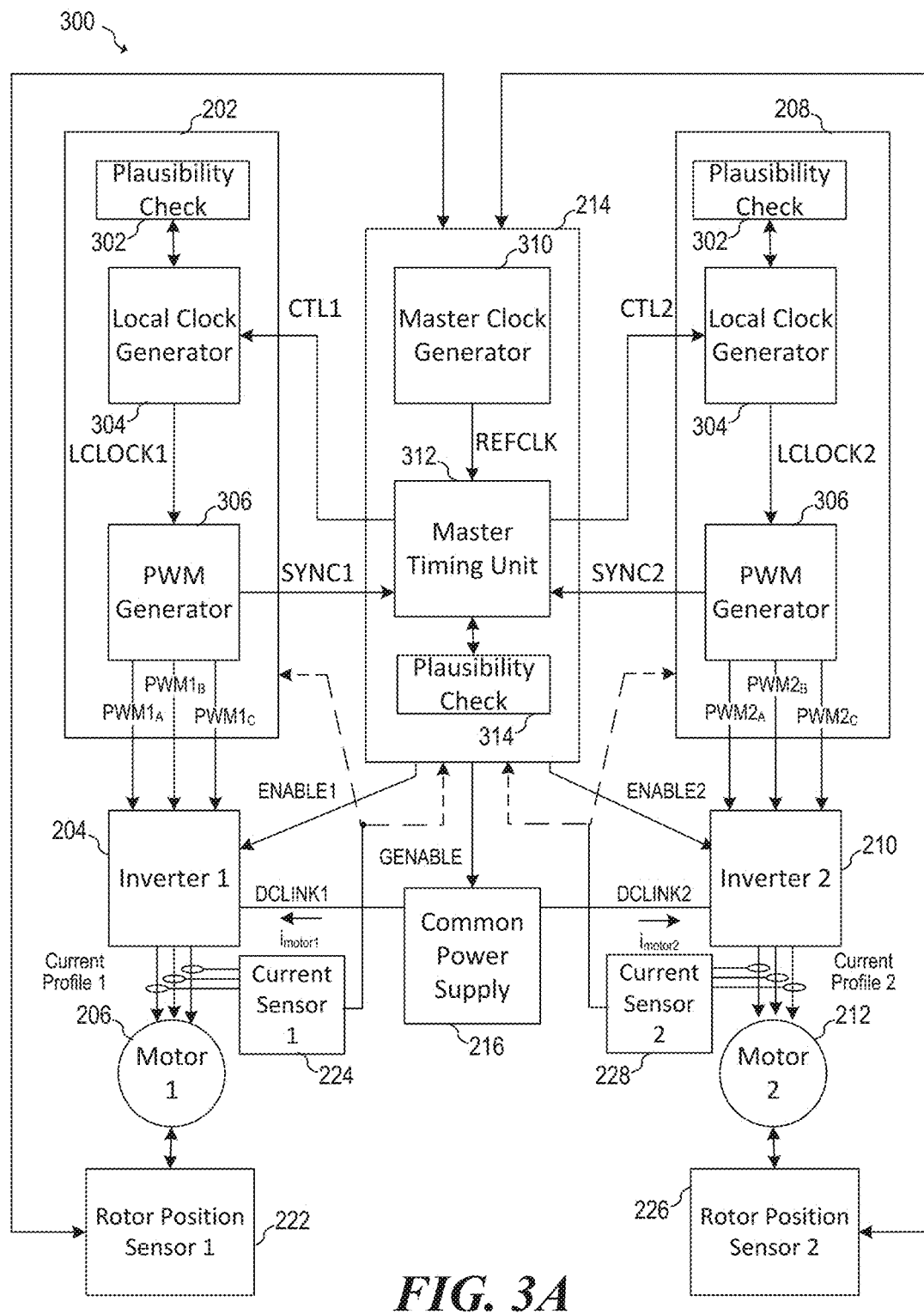
FIG. 3A illustrates a detailed view of an embodiment motor drive system.

FIG. 3A illustrates a more detailed view of motor system 300 that includes various applicable details of master device 214 and slave motor drivers 202 and 208. In some embodiments, motor system 300 may be used to implement motor system 200 shown in FIG. 2. As shown, master device 214 includes a master clock generator 310, a master timing unit 312, and a plausibility check circuit 314. Each of slave motor drivers 202 and 208 include a local clock generator 304, a PWM generator 306 and a plausibility check circuit 302. During operation, master clock generator 310 produces reference clock signal REFCLK, which can also be referred to as a reference timing signal. Master timing unit 312 compares the phase of reference clock signal REFCLK with received synchronization signals SYNC1 and SYNC2 transmitted by slave motor drivers 202 and 208. Based on the comparison performed by master timing unit 312, control signals CTL1 and CTL2 are sent to the local clock 304 of slave motor drivers 202 and 208. These control signals CTL1 and CTL2 may be sent via communication buses COMM1 and COMM2 shown in FIG. 2, or may be sent via an independent bus in alternative embodiments. Control signals CTL1 and CTL2 may include, for example, frequency adjustment commands to increase or decrease the frequency of clock signals LCLOCK1 and LCLOCK2 produced by slave motor drivers 202 and 208. Plausibility check circuit 314 of master device 214 may work with master timing unit 312 to monitor synchronization signals SYNC1 and SYNC2. If one or both of synchronization signals SYNC1 and SYNC2 are not received within a predetermined period of time, plausibility check circuit 314 causes master device to 14 to shut down motors 206 and 212 by disabling inverters 204 and 210 via enable signals ENABLE1 and ENABLE2 and/or by shutting down common power supply 216 via the global power enable signal GENABLE.

Slave motor driver 202 produces its local clock signal LCLOCK1 using local clock generator 304. During operation, local clock generator 304 adjusts the frequency of local clock signal LCLOCK1 based on control signal CTL1 received from master device 214. PWM generator 306, which can also be referred to as a drive signal generator or a switch driving signal generator, produces three-phase PWM signals $PWM1_A$, $PWM1_B$ and $PWM1_C$ based on local clock signal LCLOCK1, as well as producing synchronization signal SYNC1 that has a fixed phase relationship with the PWM cycle of three-phase PWM signals $PWM1_A$, PWM1$_B$ and PWM1$_C$. Similarly, slave motor driver 208 produces its local clock signal LCLOCK2 using local clock generator 304 and adjusts the frequency of local clock signal LCLOCK2 based on control signal CTL2. PWM generator 306 of slave motor driver 208 produces three-phase PWM signals PWM2$_A$, PWM2$_B$ and PWM2$_C$ based on local clock signal LCLOCK2, and produces synchronization signal SYNC2 having a fixed phase relationship with the PWM cycle of three-phase PWM signals PWM2$_A$, PWM2$_B$ and PWM2$_C$. In alternative embodiments, PWM generator 306 may be replaced with a switch driving signal generator that produces other types of switching signals, such as independent switch on and switch off commands.

In various embodiments, local clock generators 304 may be implemented using a frequency controllable oscillator, for example, an RC oscillator or a VCO (voltage controlled oscillator). Alternatively, other frequency controllable oscillator circuits may be used. The frequency of local clock signals LCLOCK1 and/or LCLOCK2 may be controlled by directly controlling the frequency of the frequency controllable oscillator, by controlling a controllable clock divider coupled to the respective frequency controllable oscillator, or by a combination thereof. Alternatively, other systems and method may be used to adjust the frequency of LCLOCK1 and/or LCLOCK1 such as using a phase locked loop.

In various embodiments, plausibility check circuits 302 of slave motor drivers 202 and 208 monitor respective control signal CTL1/CTL2 or other communication signals received from master device 214. If respective control signal CTL1/CTL2 is not received within a predetermined period of time, PWM generator 306 stops sending respective three-phase PWM signals PWM1$_A$, PWM1$_B$ and PWM1$_C$ or PWM2$_A$, PWM2$_B$ and PWM2$_C$, which effectively shuts down motors 206 and 212. While FIG. 3A only shows two slave motor drivers 202 and 208, should be appreciated that in alternative embodiments of the present invention greater or fewer than two slave motor drivers can be used depending on the particular system and its specifications.

Figure 3B:
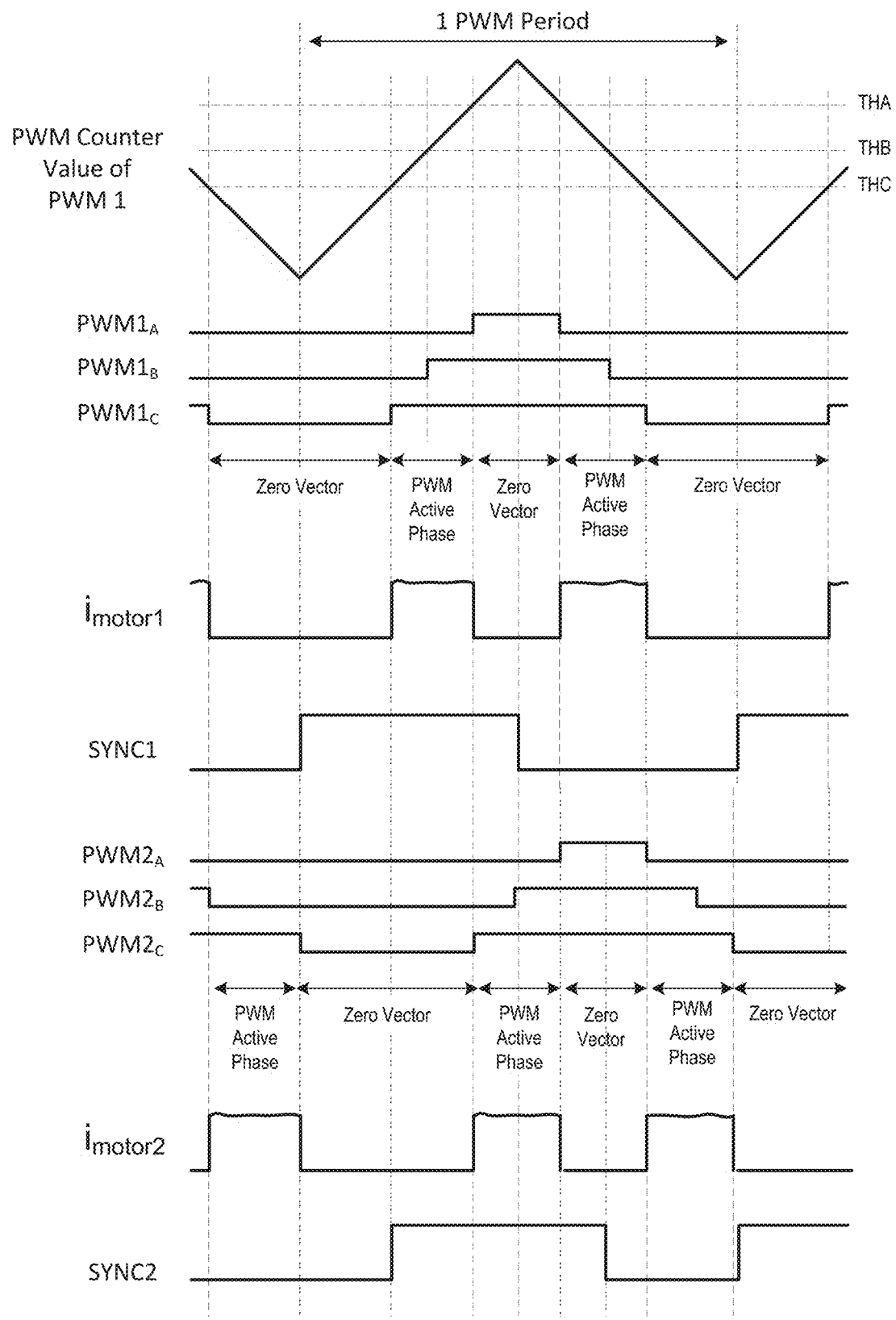
FIG. 3B illustrates a waveform diagram that illustrates the operation of the motor drive system of FIG. 3A.

FIG. 3B illustrates a waveform diagram that shows the operation of motor system 300 illustrated in FIG. 3A. The graph of PWM counter value represents a digital counter value of a digital counter within PWM generator 306 of slave motor driver 202. During operation, the PWM counter values are compared to thresholds THA, THB and THC in order to generate three-phase PWM signals PWM1$_A$, PWM1$_B$ and PWM1$_C$. For example, when the PWM counter value exceeds threshold THA, PWM1$_A$ is asserted; when the PWM counter value exceeds threshold THB, PWM1$_{AB}$ is asserted; and when the PWM counter value exceeds threshold THC, PWM1$_C$ is asserted. As shown, DC-Link current i$_{motor1}$ to motor 1 corresponding to the current delivered to motor 206 via inverter 204, is provided (absolute value is different from zero, either in the positive or negative direction, depending on motor or generator mode) when at least two of PWM signals PWM1$_A$, PWM1$_B$ and PWM1$_C$ are in a state different from each other. Such a state is designated in FIG. 3B as a "PWM Active Phase." When all of three-phase PWM signals PWM1$_A$, PWM1$_B$ and PWM1$_C$ are in the same state (e.g., all high or all low), motor current i$_{motor1}$ is decreasing (towards zero), which is designated in FIG. 2B as a "Zero Vector." In various embodiments, thresholds THA, THB and THC are adjusted by master device 214 in order to control the duty cycle and the power delivered to motor 206.

PWM generator 306 of slave motor driver 202 also generates synchronization signal SYNC1 that is monitored by master device 214 as described herein. As shown, synchronization signal SYNC1 is asserted during the first half of the PWM period when the PWM counter is increasing and is de-asserted during the second half of the PWM period when the PWM counter is decreasing. It should be understood that the phase relationships between synchronization signal SYNC1 and three-phase PWM signals PWM1$_A$, PWM1$_B$ and PWM1$_C$ and the PWM counter value are just examples for the purpose of illustration. In alternative embodiments, the phase relationships may be different. For example, synchronization signal SYNC1 may be asserted and de-asserted in a different phase of the PWM period. It should be understood that synchronization signal SYNC1 may be an active high or an active low signal, such that the system considers synchronization signal SYNC1 to be asserted at its rising edge transition (active high) or at its falling edge transition (active low), such that the rising edge transition and/or falling edge transition is synchronized to a predetermined phase of switch driving three-phase PWM signals PWM1$_A$, PWM1$_B$ and PWM1$_C$, which may also be referred to as switching signals.

FIG. 3B also illustrates synchronization signal SYNC2 and three-phase PWM signals PWM2$_A$, PWM2$_B$ and PWM2$_C$ generated by PWM generator 306 in slave motor driver 208, as well as motor current i$_{motor2}$ corresponding to the current delivered to motor 212 via inverter 210. In embodiments, synchronization signal SYNC2 and three-phase PWM signals PWM2$_A$, PWM2$_B$ and PWM2$_C$ generated by PWM generator 306 in a similar fashion as between synchronization signal SYNC1 and three-phase PWM signals PWM1$_A$, PWM1$_B$ and PWM1$_C$ that are generated by PWM generator 306 in slave motor driver 202 as described above.

As shown, three-phase PWM signals PWM2$_A$, PWM2$_B$ and PWM2$_C$ are delayed with respect to three-phase PWM signals PWM1$_A$, PWM1$_B$ and PWM1$_C$ such that the PWM Active Phase of slave motor driver 202 overlaps with a Zero Vector of slave motor driver 208, and the PWM Active Phase of slave motor driver 208 corresponds to a Zero Vector of slave motor driver 202. (The PWM counter value generated by PWM generator 306 of slave motor driver 208 is not shown.) As a result of the shifting of PWM signals, motor currents i$_{motor1}$ and i$_{motor2}$ flow at different times from each other or with a defined phase shift to minimize the duration where both have their maximum values at the same time, thereby avoiding high peak currents in the supply unit. The shifting of PWM signals in slave motor driver 208 with respect to slave motor driver 202 may be produced by using different threshold values and/or by shifting the PWM counter value of slave motor driver 208 with respect to slave motor driver 202. In various embodiments, this condition is attained when master device 214 synchronizes the PWM periods of slave motor drivers 202 and 208 using synchronization signals SYNC1 and SYNC2. While synchronization signals SYNC1 and SYNC2 are shown to have the same phase in in FIG. 3B, in some embodiments, the SYNC1 and SYNC2 may be synchronized such that they have a constant phase offset corresponding to the timing difference between the PWM signals generated by slave motor driver 202 and slave motor driver 208. This timing difference may be about the width of a PWM Active Phase in some embodiments to ensure that the Active Phases in one slave motor driver corresponds with the Zero Vector of the other.

Figure 4A:
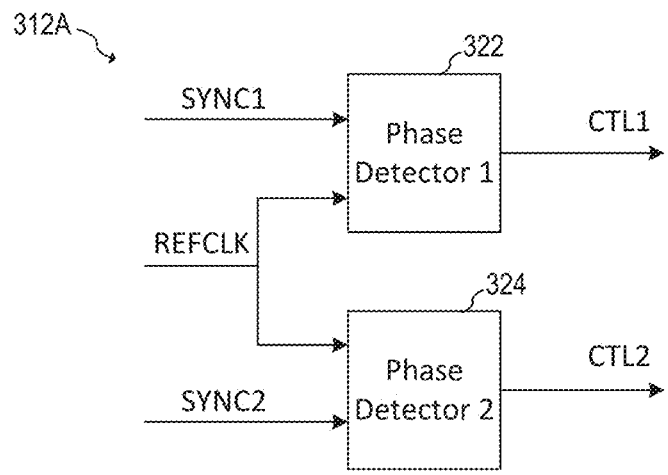
FIGS. 4A-4E illustrate block diagrams and corresponding waveform diagrams of embodiment master timing units.

FIG. 4A illustrates a master timing unit 312A that may be used to implement master timing unit 312 illustrated in FIG. 3A. As shown, master timing unit 312A includes a timing analysis circuit that includes a first timing difference measurement circuit 322 that is used to determine a phase difference between synchronization signal SYNC1 generated by slave motor driver 202 and reference clock REFCLK, and a second timing difference measurement circuit 324 that is used to determine a phase difference between synchronization signal SYNC2 generated by slave motor driver 208 and reference clock REFCLK. Output signals CTL1 and CTL2 of timing difference measurement circuits 322 and 324 may indicate whether the respective synchronization signals leads or lags reference clock REFCLK. If the respective synchronization signal SYNC1 or SYNC2 leads reference clock REFCLK, then the respective timing difference measurement circuit 322 or 324 produces a value representing a command DECREASE to decrease the local clock frequency in the respective slave motor driver. On the other hand, if the respective synchronization signal SYNC1 or SYNC2 lags reference clock REFCLK, then the respective timing difference measurement circuit 322 or 324 produces a value representing a command INCREASE to increase the local clock frequency in the respective slave motor driver 202 or 208. These commands can take the form of any digital bit, word, command or other signal corresponding to the control signal that is communicated to the slave motor driver 202 or 208. For example, in some embodiments, control commands CTL1 and CTL2 can be formatted as a single bit whose state represented whether the synchronization leads or lags the reference clock signal REFCLK. Alternatively, the CTL1 and CTL2 may represent the amount of time by which the synchronization leads or lags the reference clock signal REFCLK. In other embodiments, control commands CTL1 and CTL2 may be appear in a data field of a bus command that is formatted according to a predetermined bus standard used in the system. In various embodiments, timing difference measurement circuits 322 and 324 may be implemented using phase detector circuits known in the art, such as latch-based phase frequency detectors or other digital circuits configured to measure the relative timing between two signals and produce an output indicative of the timing difference.

Figure 4B:
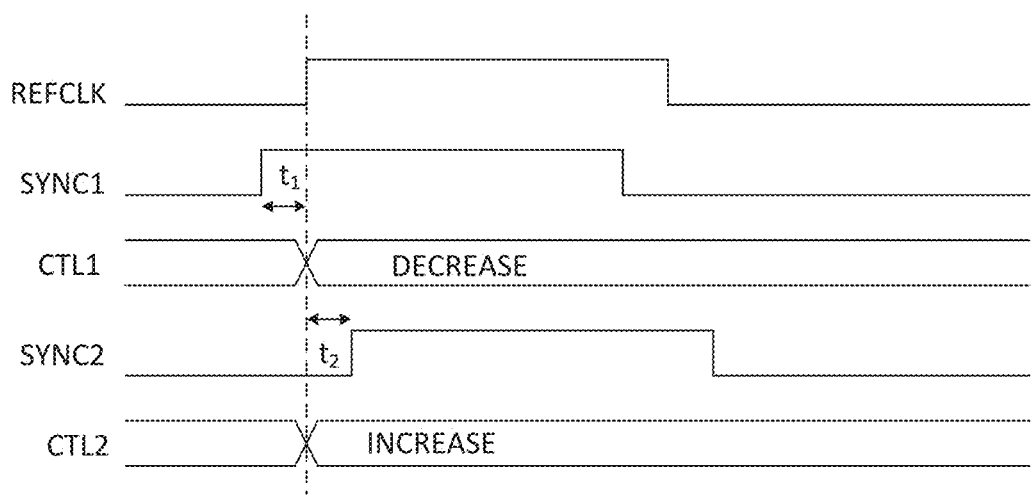

FIG. 4B shows a waveform diagram that illustrates that operation of master timing unit 312A. As shown, synchronization signal SYNC1 leads reference clock REFCLK by time $t_1$. Accordingly, timing difference measurement circuit 322 outputs control CTL1 having a value representing a request to decrease the frequency of the clock signal produced by slave motor controller 202. As is further shown, synchronization signal SYNC2 lags reference clock REFCLK by time $t_2$. Accordingly, timing difference measurement circuit 324 outputs control CTL2 having a value representing a request to increase the frequency of the clock signal produced by slave motor controller 208. In some embodiments a minimum timing difference may be tolerated and does not lead to an "INCREASE" or "DECREASE" command, but to a "KEEP" that maintains a current clock frequency, for example, when the timing difference between REFCLK and SYNC1 or SYNC2 is below a minimum timing threshold.

Figure 4C:
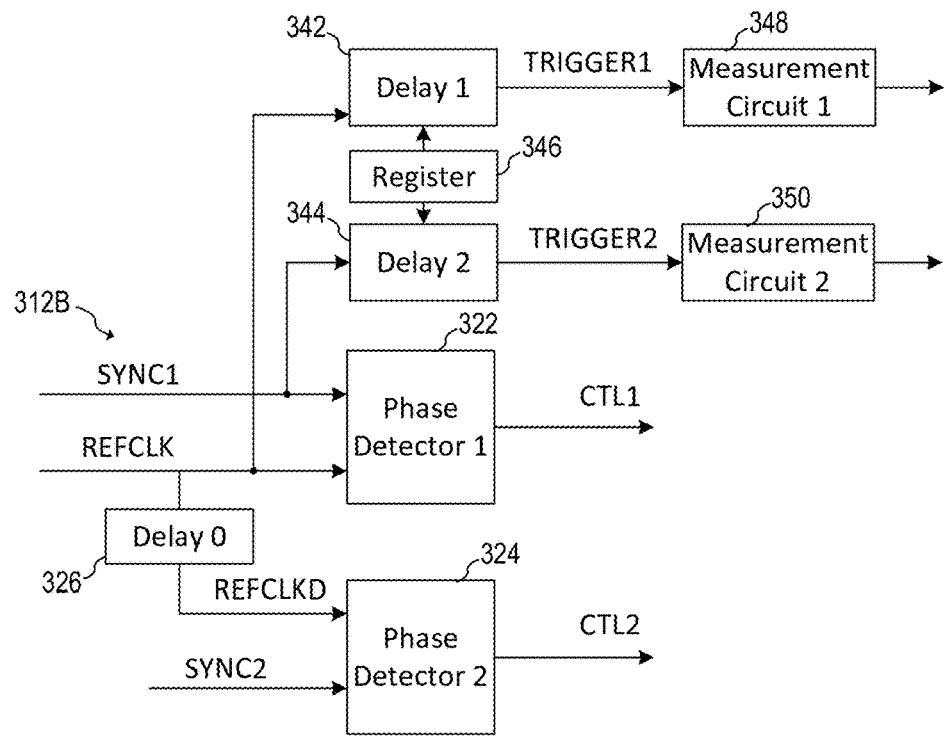

In some embodiments, slave motor drivers 202 and 208 may be configured to provide non-overlapping currents to respective motors 206 and 212 by offsetting their respective PWM cycles by a fixed timing offset. In such cases, the master timing unit 312 may generate control signals CTL1 and CTL2 to provide a fixed timing offset between synchronization signals SYNC1 and SYNC2, as shown in FIG. 4C, which illustrates a master timing unit 312B that may also be used to implement master timing unit 312 illustrated in FIG. 3A. Master timing unit 312B is similar to master timing unit 312A shown in FIG. 4A with the addition of delay circuit 326 that produces delayed reference clock signal REFCLKD based on reference clock REFCLK. In various embodiments, delay circuit 326 is configured to provide a delay that corresponds to the timing delay necessary to produce non-overlapping motor currents. Delay circuit 326 may be implemented using a digital counter and a digital comparator whose threshold can be set to correspond to a programmed delay values. Alternatively, other delay circuits known in the art may be used. In embodiments in which reference clock REFCLK is produced using a clock divider, REFCLK and REFCLKD may be configured to produce clocks of a programmable timing difference by using different terminal counts to produce the respective clock signals.

In some embodiments, measurement circuits 348 and 350 or other units located inside or outside the master device may be triggered depending on the timing of REFCLK, delayed REFCLK or a SYNC signal. Measurement circuits 348 and 380 may include, for example, rotor position sensors, current sensors, temperature sensors and/or data converters, analog-to-digital converters (ADCs), or sampling circuits configured to receive and process the output of sensors or other devices. As shown, measurement circuit 348 is activated by trigger signal TRIGGER1, which is generated by delay circuit 342 having an input coupled to clock signal REFCLK. Measurement circuit 350 is activated by trigger signal TRIGGER2, which is generated by delay circuit 344 having an input coupled to clock signal SYNC1. When the operation of measurement circuits 348 and 350 is synchronized to the generation of the PWM signals and the switching of the power switches, measurement windows can be defined such that the noise effects of the switching activity is minimum. In some embodiments, the delays produced by delay circuits 342 and 344 may be programmable and/or adjustable depending on the operation of the motor. In some embodiments, delay circuits 342 and 344 may also include a one-shot circuit configured to generate a pulse. For example, the delay of delay circuits 342 and 344 may be set via register 346. Delay circuits 342 and 344 may be implemented, for example, using delay circuits or programmable delay circuits known in the art that are configured to provide a predetermined delay.

Figure 4D:
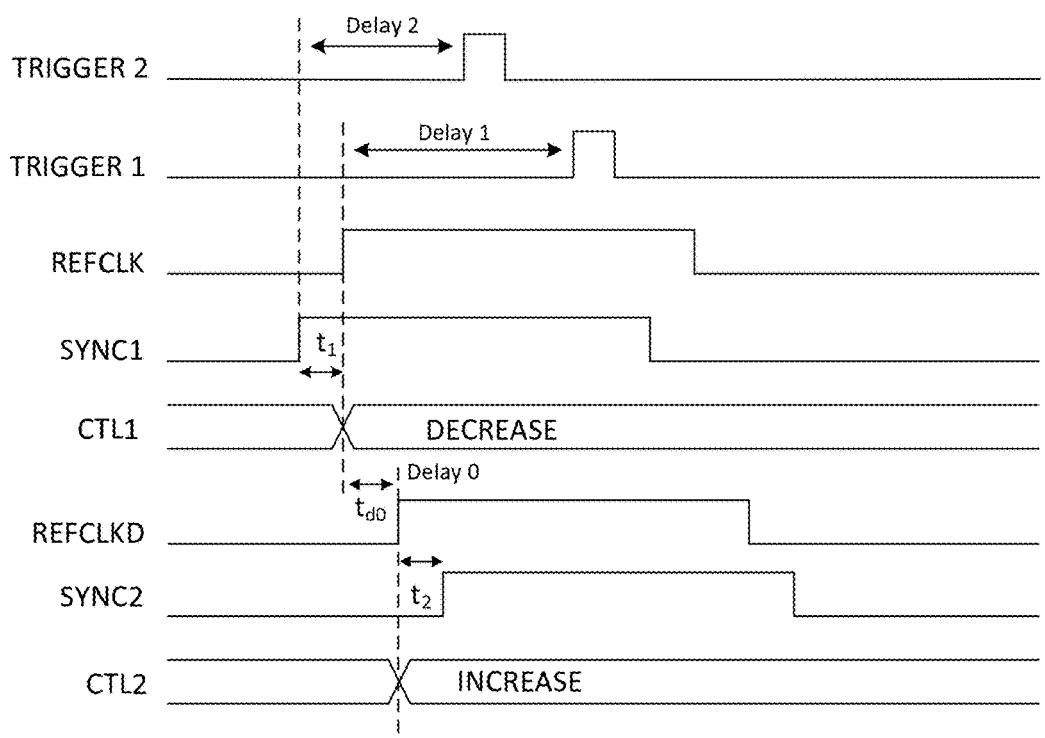
Figure 4E:
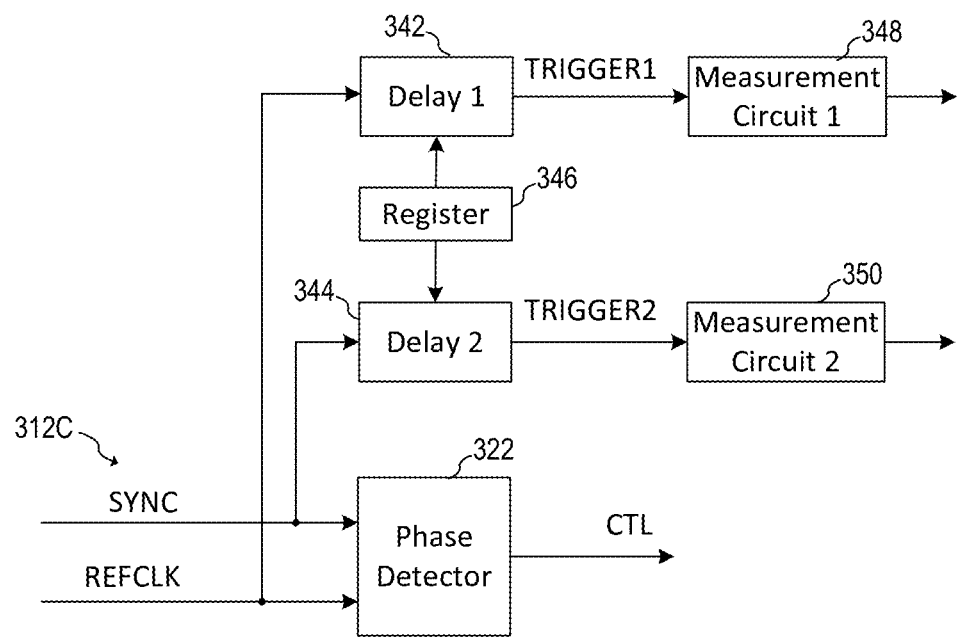

FIG. 4D shows a waveform diagram that illustrates that operation of master timing unit 312B in which delayed reference clock REFCLKD is delayed by time $t_d$. As shown, synchronization signal SYNC1 leads reference clock REFCLK by time $t_1$. Accordingly, timing difference measurement circuit 322 outputs control CTL1 having a value representing a request to decrease the frequency of the clock signal produced by slave motor controller 202. As is further shown, synchronization signal SYNC2 lags reference delayed clock REFCLKD by time $t_2$. Accordingly, timing difference measurement circuit 324 outputs control CTL2 having a value representing a request to increase the frequency of the clock signal produced by slave motor controller 208. In some embodiments, a minimum timing difference may be tolerated and does not lead to an "INCREASE" or "DECREASE" command, but to a "KEEP" that maintains a current clock frequency, for example, when the timing difference between REFCLK and SYNC1 or SYNC2 is below a minimum timing threshold. As shown, trigger signal TRIGGER1 is delayed by a time period of Delay 1 with respect to the rising edge of reference clock REFCLK and signal TRIGGER2 is delayed by a time period of Delay 2 with respect to the rising edge of synchronization signal SYNC1.

Master timing unit 312C is similar to master timing unit 312B shown in FIG. 4C with the exception that only a single phase detector 322 is implemented. Master timing unit 312C may be used, for example, in systems that include a single slave motor driver device.

Figure 5A:
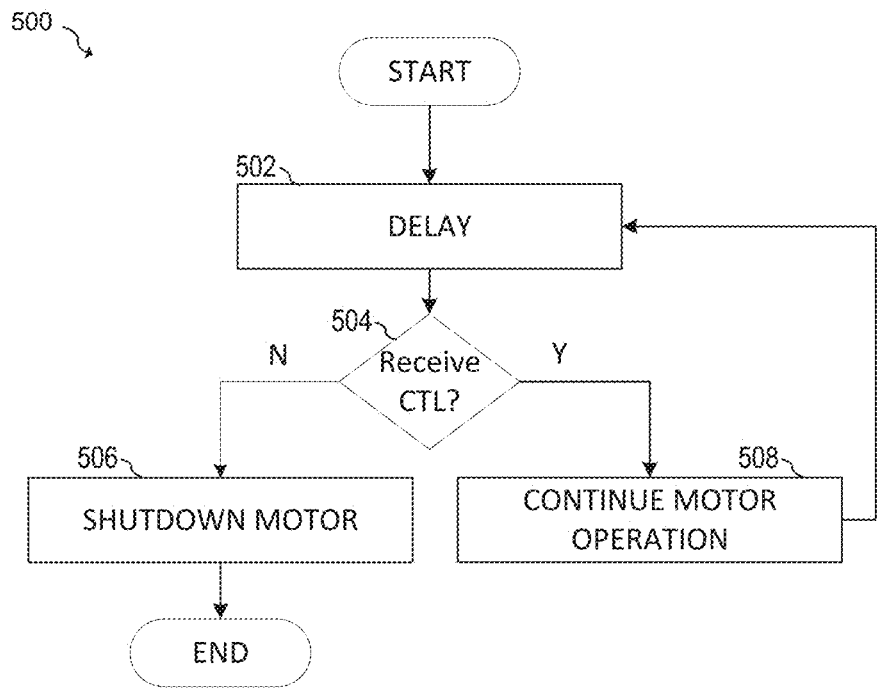
FIGS. 5A and 5B illustrate block diagrams of embodiment plausibility check methods.

FIG. 5A illustrates a flowchart of a method of performing a plausibility check that may be implemented, for example, by plausibility check circuits 302 in slave motor drivers 202 and 208 shown in FIG. 3A. In an embodiment, incoming control signals from the master device (such as master device 214) are monitored by the slave motor driver (step 504). If an expected incoming control signal is received within a predetermined time or time window (represented by delay step 502), operation of the motor is continued (step 508). In various embodiments, the slave motor controller continues to operate the motor by sending PWM signals to the motor via an inverter circuit. If the expected incoming control signal from the master device is not received within the predetermined period of time, then the motor is shut down in step 506. Expected incoming control signals may include, for example, instructions to modify the frequency of a local clock, instructions to set a duty cycle of a PWM signal, regularly generated bus commands, status commands, life sign commands or other commands. Shutting down the motor may include, for example, discontinuing the transmission of PWM signals to the motor.

Figure 5B:
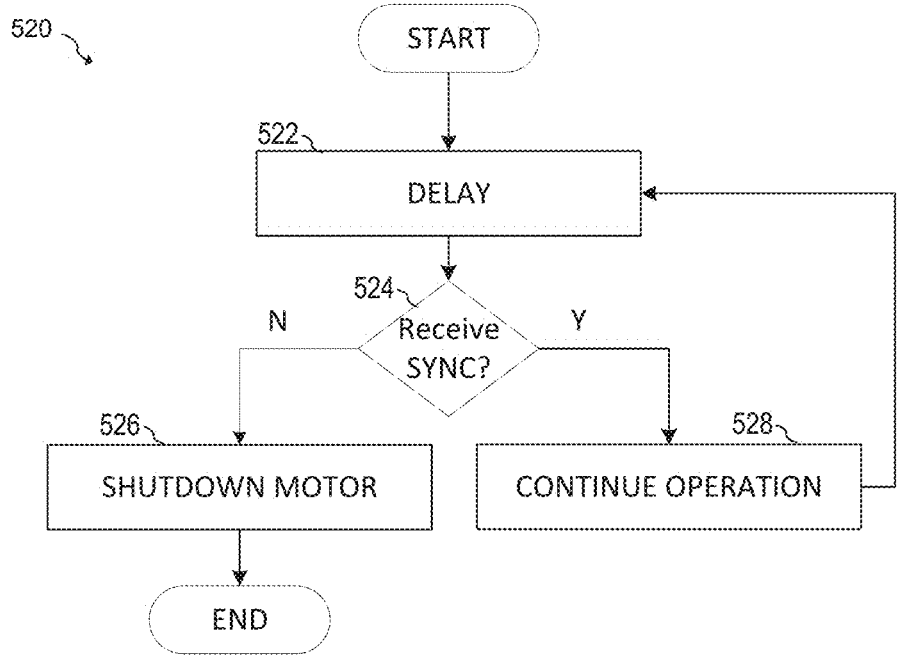

FIG. 5B illustrates a flowchart of a method of performing a plausibility check that may be implemented, for example, by plausibility check circuit 314 in master device 214 shown in FIG. 3A. In an embodiment, incoming synchronization signals (such as SYNC1 and SYNC to generated by slave motor controllers 202 and 208) are monitored by the master device (step 524). If an expected synchronization signal is received within a predetermined time or time window (represented by delay step 522), operation of the motor is continued (step 528). In various embodiments, the master device continues to operate the motor by providing power and/or an enable signal to the inverter, such as inverter 204 and 210 shown in FIG. 3A. If the expected incoming synchronization signal is not received within the predetermined period of time, then the motor is shut down in step 526. Shutting down the motor may include, for example, disabling the inverter by de-asserting and/or by disabling the power supply to the inverter.

Methods 500 and 520 depicted in FIGS. 5A and 5B may be implemented using digital circuits known in the art, such as state machine circuits. The functionality of methods 500 and 520 may also be implemented by a processor that executes code. Alternatively, other circuits known in the art may be used.

Figure 6A:
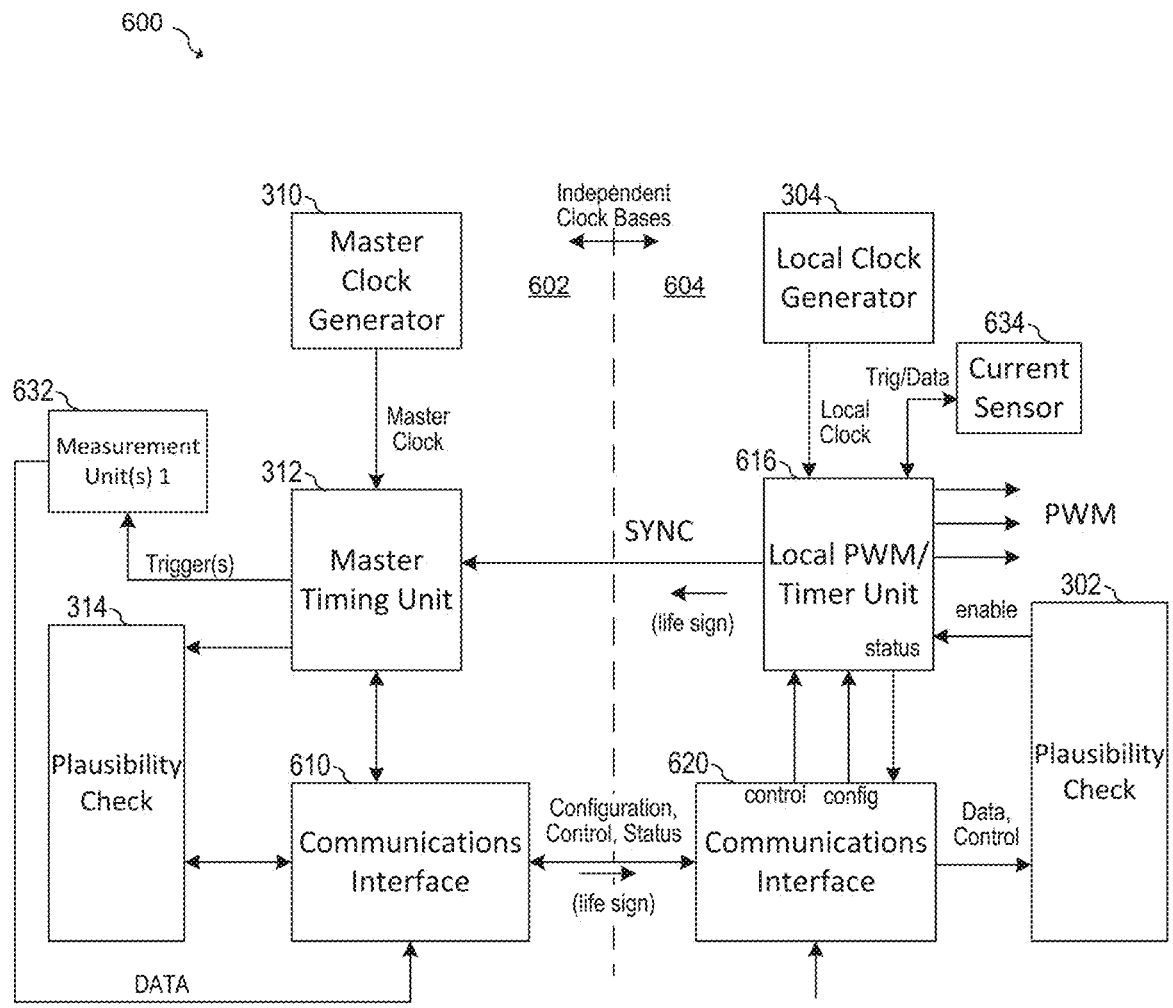
FIGS. 6A, 6B and 7 illustrate embodiment motor control circuits.

FIG. 6A illustrates a block diagram of motor control circuit 600, according to another embodiment of the present invention. A master controller 602 is represented on the left-hand side of the block diagram and a slave motor controller 604 is represented on the right hand side of the block diagram. As shown, master controller 602 includes master clock generator 310, master timing unit 312, plausibility and communications interface 610. In some embodiments, a measurement unit 632, which may be configured to measure a motor rotor position or may be configured to sample a measurement signal provided by a rotor position sensor, may be controlled by master timing unit 312 via a trigger signal and provide data to communications interface circuit 610. Master clock generator 310, master timing unit 312 and plausibility check circuit 314 operate as described above with respect to FIG. 3A. Communications interface 610 sends configuration, control and status information to slave motor controller 604. Slave motor controller 604 includes local clock generator 304, local PWM timer unit 616, plausibility check circuit 302 and communications interface 620. Local clock generator 304 and plausibility check circuit 302 operate as described above with respect to FIG. 3A. Local PWM timer unit 616 operates as described above with respect to PWM generator 306 with the addition of an interface to communications interface 620. During operation, communications interface 620 sends control and configuration commands to local PWM timer circuit 616. These control and configuration commands may include configuration commands that define the duty cycle of the various PWM signals generated by local PWM timer unit 616.

Communications interface 620 may also be configured to receive status information from local PWM timer unit 616. The status information may include, for example, diagnostic information such as remote temperature, failure information etc. In addition, communications interface 620 sends data and control information to plausibility check circuit 302 so that plausibility check circuit 302 can make a determination of whether or not expected configuration, control and/or status information is being received from master controller 602. If the expected configuration control and/or status information is not received from master controller 602 within a predetermined period of time, plausibility check circuit 302 may disable local PWM timer circuit 616 by de-asserting an enable signal. In various embodiments, master timing unit 312, receives synchronization signal SYNC and compares the timing of synchronization signal with a master clock signal generated by master clock generator 310. A control word may be sent to slave motor controller 604 from communications interface 610 that indicates whether synchronization signal SYNC is leading or lagging the master clock generated by master clock generator 310. In some embodiments, the communications interface 610 acts as a command generation circuit that produces clock control commands based on the output of master timing unit 312 to control the frequency of the local clock produced by local clock generator 304.

Current sensor 634 may be configured to measure the current provided to each phase of the motor being controlled. In the depicted embodiments, a measurement is triggered by a trigger signal at a trigger input and the resulting measurement is provided to local PWM timer unit 616 via signal DATA.

Figure 6B:
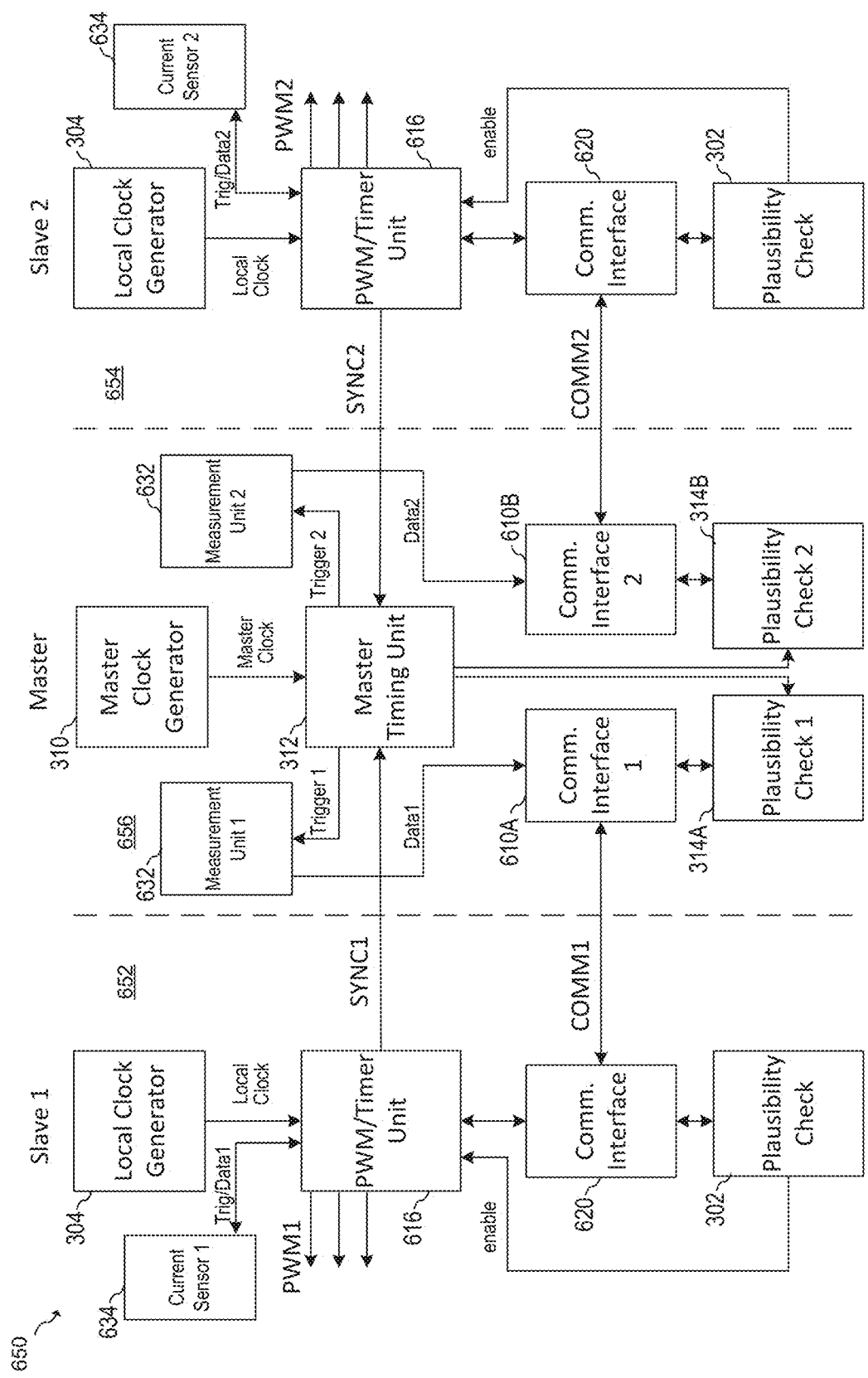

FIG. 6B illustrates motor control system 650 that includes master controller 656 and two slave motor controllers 652 and 654. Master controller 656 is similar to master controller 604 illustrated in FIG. 6A, with the exception that communications interface 610 is partitioned into two communication interfaces: communications interface 610A that is coupled to communications interface 620 of slave motor controller 652, and communications interface 610B that is coupled to communications interface 620 of slave motor controller 654; and plausibility check circuit 314 is partitioned into two plausibility check circuits: plausibility check circuit 314A that is devoted to monitoring communication interface 610A of slave motor controller 652, and plausibility check circuit 314B that is devoted to monitoring communication interface 610B of slave motor controller 654. It should be understood that embodiment motor control circuits may adapted to control any number of motors. In such embodiments, master controller 656 may be adapted to include a number of communications interfaces 610 and plausibility check circuits 314 that correspond to the number of motors to be controlled. In addition, such systems may include a separate slave motor controller for each motor.

Figure 7:
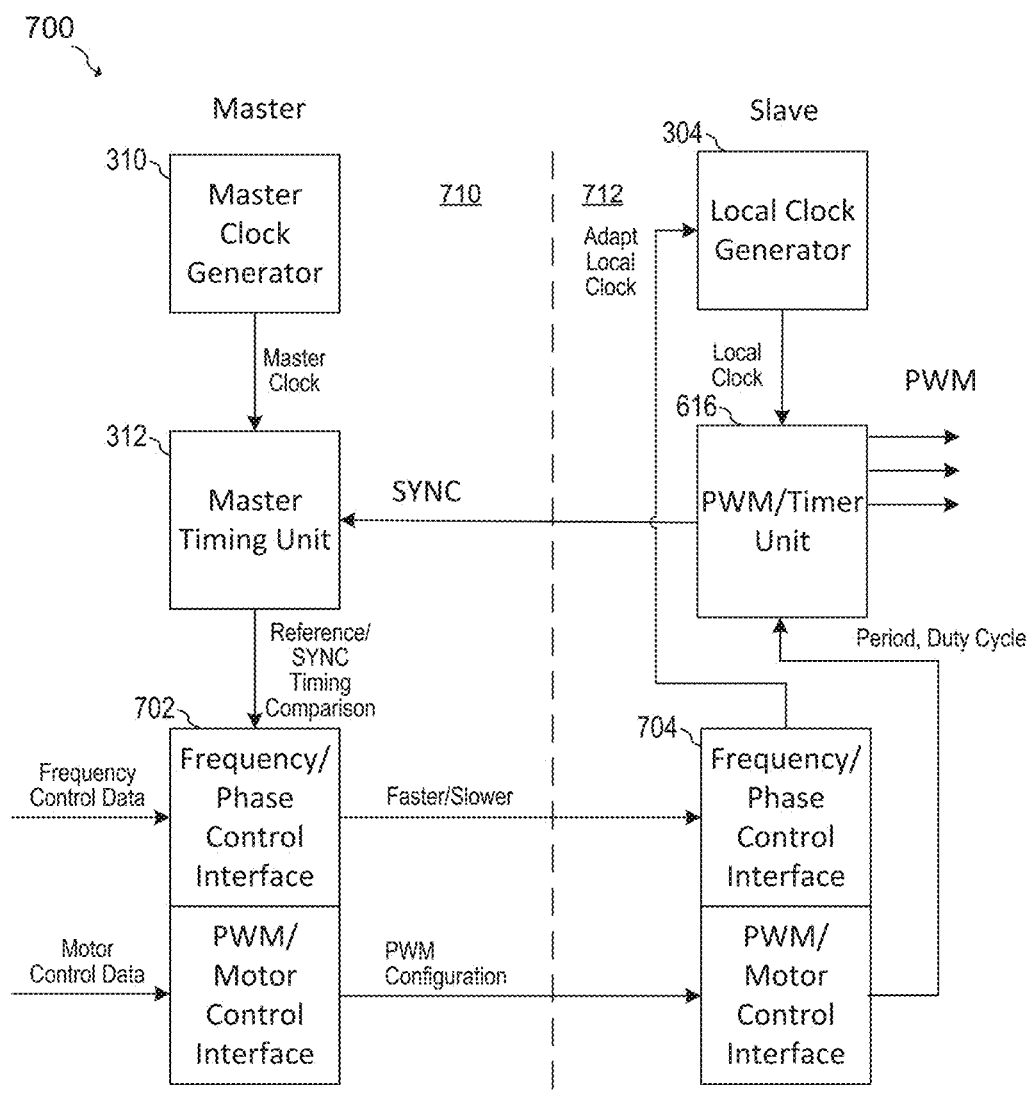

FIG. 7 shows a block diagram of motor control circuit 700 that illustrates how the control functions relating to clock synchronization and pulse width modulation configuration can be controlled independently. As shown motor controller 700 includes master controller 710 and slave controller 712. Master controller 710 includes master clock generator 310, master timing unit 312 and controller 702. Controller 702 performs two independent functions: a frequency phase control interface and the PWM motor control interface. The frequency phase control interface accepts frequency control data that may include, for example, data generated by a frequency or phase shift control task, as well as reference versus synchronization signal timing comparison information performed by master timing unit 312. From this information, the frequency/phase control interface produces a control signal (faster/slower/keep) that increases or decreases the frequency of the local clock generated by local clock generator 304. The PWM motor control interface of controller 702 produces PWM configuration data based on motor control data provided by master controller 710. This configuration data is sent to the PWM/timer unit 616 of slave controller 712 and may include, for example, a duty cycle command that defines the duty cycle, as well as other commands that define the frequency of operation of the PWM signals generated by PWM/timer unit 616. For example, the configuration data may include switch-on and switch-off timing information that defines the switching signals generated by PWM/timing unit 616. Slave motor controller 712 includes local clock generator 304, PWM/timer unit 616 and local controller 704 that includes a frequency/phase control interface and a PWM/motor control interface corresponding to the frequency/phase control interface and a PWM/motor control interface of controller 702 of master controller 710. As shown, local controller 704 accepts the faster/slower/keep control signal generated by the frequency/phase control interface of controller 702, and accepts the PWM configuration generated by the PWM/motor control interface of controller 702 of master controller 710. Local controller 704 is configured to send frequency adjustment signals to local clock generator 304. In various embodiments, these control signals are configured to either increase the frequency of the clock produced by local clock generator 304 or decrease the frequency of the clock produced by local clock generator 304. The PWM motor control interface of local controller 704 also sends the duty cycle information to PWM/timer unit 616. It should be appreciated that the frequency/phase control interface and the PWM/motor control interface of master controller 710 and slave motor controller 712 may operate independently of each other. This independent operation simplifies the operation of the system, and decouples the calculation and control of local clock generation from the calculation and control of PWM generation. It should be appreciated that the partitioning of the functions of controller 702 of master controller 710 and a local controller 704 of slave motor controller 712 can be applied to other embodiments described herein. Moreover, the motor control system 710 of FIG. 7 can also be expanded to control the operation of a plurality of slave motor controllers in a manner similar to manner similar to the systems described in FIGS. 2, 3A-3B and 6B.

Figure 8:
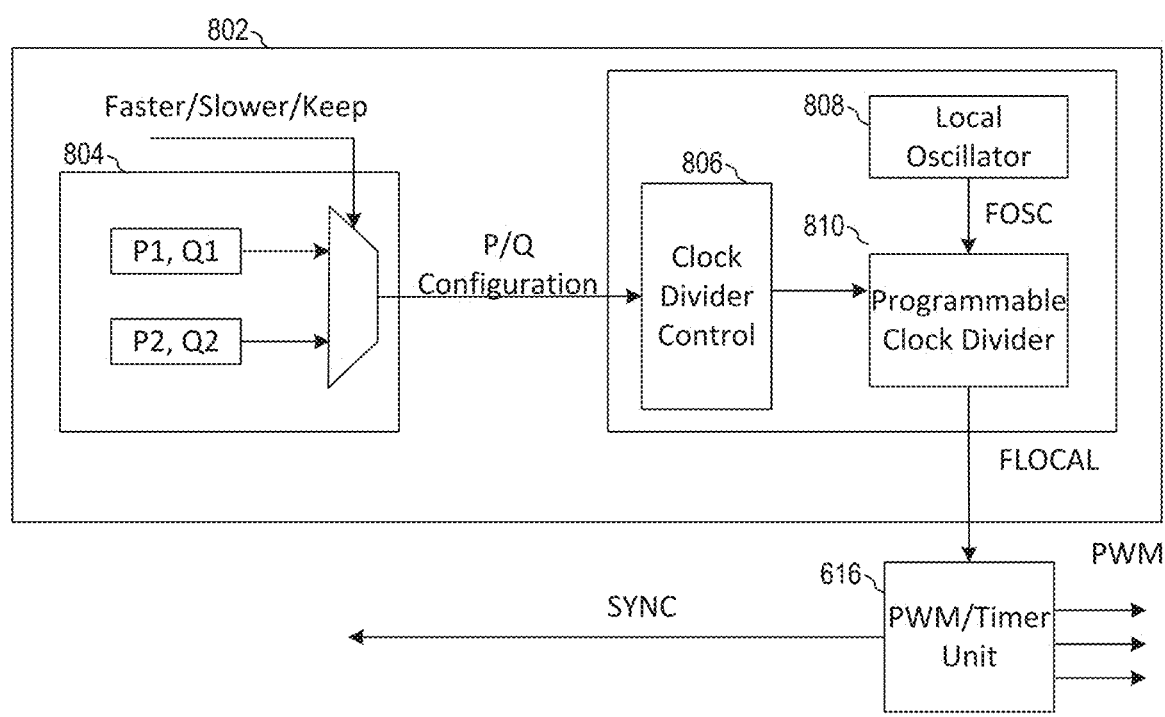
FIG. 8 illustrates an embodiment local clock generator.

FIG. 8 illustrates clock generator 802 that may be used to implement local clock generator 304 in the various embodiments disclosed herein. As shown, clock generator 802 includes local oscillator 808, one or more programmable clock dividers 810, clock divider control circuit 806 and configuration circuit 804. In an embodiment, local oscillator 808 is implemented using an RC oscillator, or other type of oscillator known in the art. The center frequency of the local oscillator 808 may be trimmed during testing in order for the oscillator to achieve the desired frequency range. In some cases, the granularity of the trimmings steps may bring the center frequency of the oscillator within about two or 3% of the nominal frequency of oscillation. Fine tuning of the oscillator is achieved by dividing the local oscillator output having a frequency of FOSC using programmable clock divider 810 to produce a local clock signal having a frequency of FLOCAL.

In some embodiments, programmable clock divider 810 is implemented using a fractional clock divider. In one specific embodiment, digital clock divider provides the division ratio of P/Q such that:

FLOCAL=$FOSC*P/Q$.

The fractional clock divider used to implement programmable clock divider 810 may be constructed using fractional clock divider circuits known in the art. For example, embodiment, programmable clock divider 810 may be a pulse swallowing divider that produces the desired clock frequency by skipping cycles according to coefficients P and Q. Accordingly, clock frequency precisions of better than 1% can be achieved in embodiments of the present invention.

In one embodiment, the phase and frequency of FLOCAL is controlled by the master controller by selecting P and Q coefficients according to whether the frequency of local oscillator 808 is to be increased, decreased or kept. This control may be implemented for example using P/Q configuration block 804 as shown in FIG. 8. For example, when a slower clock frequency is requested by the master controller, coefficients P1 and Q1 corresponding to a lower frequency are introduced to clock divider control block 806 that configures programmable clock divider 810. On the other hand, if a higher clock frequency is requested by the master controller, coefficients P2 and Q2 corresponding to a lower frequency are introduced to clock divider control block 806. If the actual local frequency is kept, the P/Q configuration may remain unchanged. Accordingly, the frequency FLOCAL of the local clock signal is adjustable by a predetermined frequency offset based on a command received by the master controller. The values of P1, Q1, P2 and Q2 may be configured by the master controller prior to operation.

Figure 9:
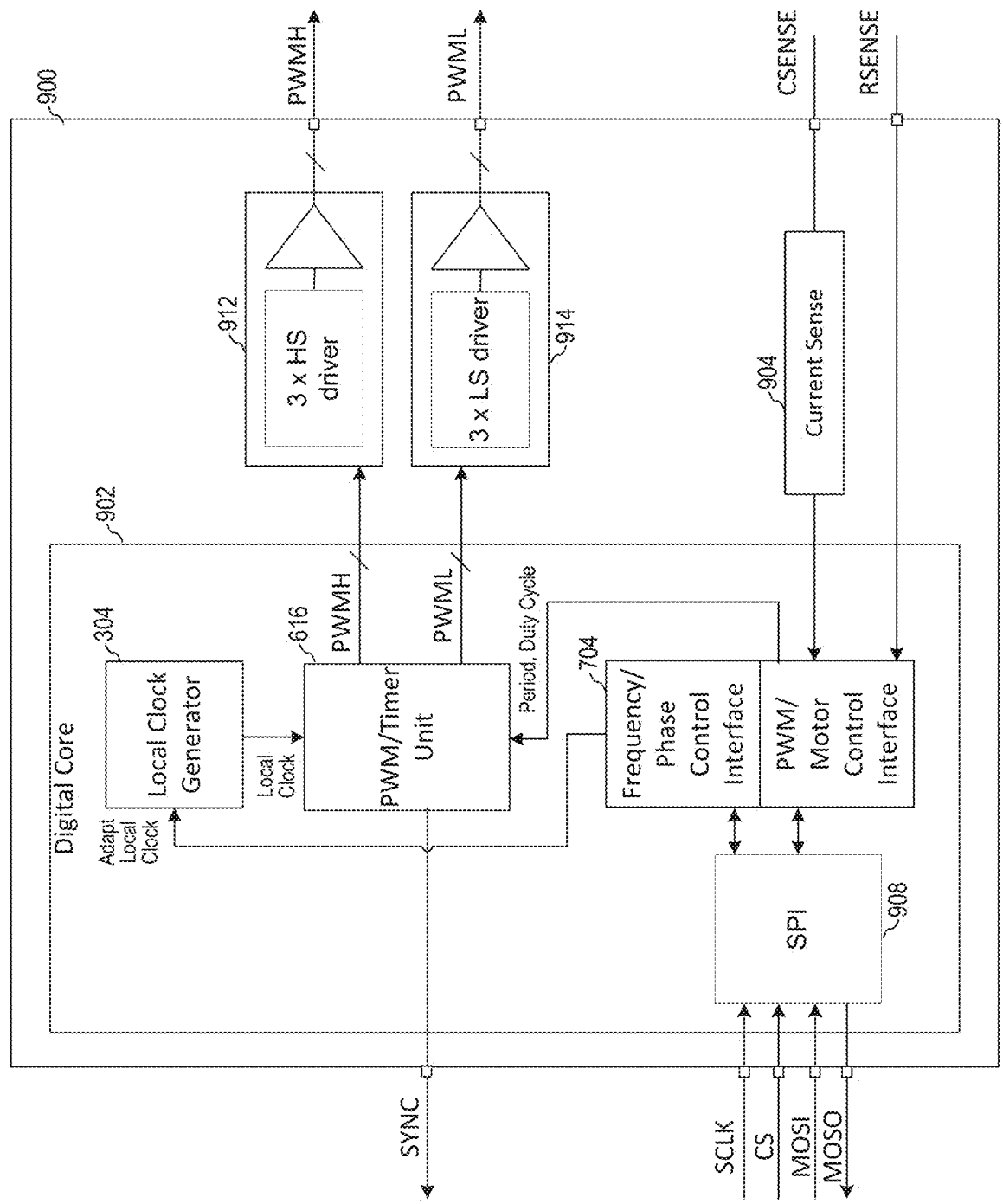
FIG. 9 illustrates an integrated circuit according to an embodiment.

While P/Q configuration block 804 is depicted as being implemented using registers in a multiplexer, it should be understood that P/Q configuration block 804 could be implemented in a variety of ways. For example, P/Q configuration block 804 could also be implemented using a lookup table or memory. In some embodiments, P/Q configuration block 804 may be implemented to include more than two P/Q configuration settings. For example, P/Q configuration block 804 may be configured to successively increment through a number of different P/Q configuration settings that are configured to successively increase or decrease frequency FLOCAL. Such an implementation may be achieved using a counter and a lookup table or memory. FIG. 9 illustrates a block diagram of a slave motor controller integrated circuit 900 in accordance with an embodiment of the present invention. As shown, slave motor controller integrated circuit 900 includes a digital core 902, a set of high side PWM drivers 912, a set of low side PWM drivers 914 and current sense circuit 904. High side PWM drivers 912 and low side PWM drivers 914 are configured to drive three-phase half bridge switching circuits in an inverter that is configured to be connected to a motor. High side PWM drivers 912 and low side PWM drivers 914 may be implemented using driver circuits known in the art. Current sense circuit 904 is configured to measure a motor current. In some embodiments, current sense circuit 904 is coupled to a sense resistor of the motor via sense signal pin SENSE. A rotor position signal (either analog or digital) may be interfaced to local controller 704 via pin RSENSE. In another embodiment, the number of generated PWM signals and the number of HS and LS drivers may be different, depending on the topology and number of phases of the motor(s).

Digital core 902 includes local clock generator 304, PWM timer unit 616, and local controller 704 that operate as described above. Local controller 704 is coupled to serial peripheral interface (SPI) 908 that is configured to be interfaced with the master controller. In alternative embodiments, SPI 908 may be implemented using an I2C interface or other type of serial or parallel digital interface.

Figure 10:
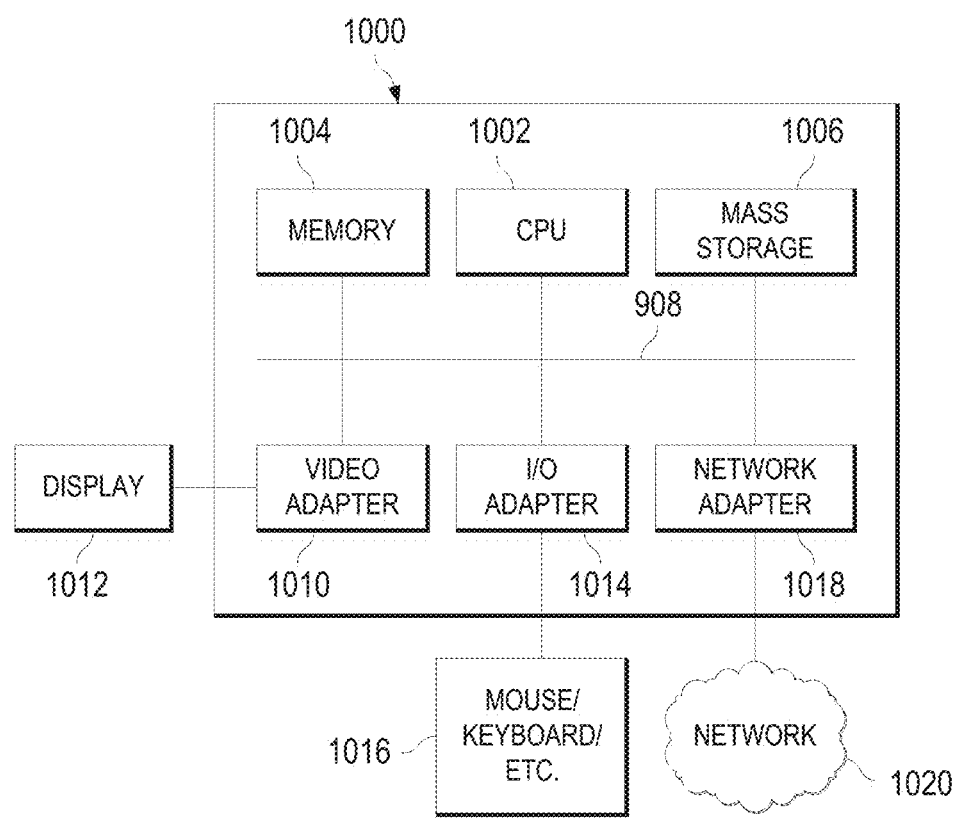
FIG. 10 illustrates a processing system that can be used to implement embodiment control circuits.

FIG. 10 illustrates a block diagram of a processing system 1000, aspects of may be used to implement various embodiment functions disclosed herein. The processing system 1000 depicts a general-purpose platform and the general components and functionality that may be used to implement portions of the embodiment driver circuit and/or an external computer or processing device interfaced to the embodiment driver circuit. The processing system 1000 may include, for example, a central processing unit (CPU) 1002, memory 1004, and a mass storage device 1006 connected to a bus 1008 configured to perform the processes discussed above. Memory 1004 and mass storage device 1006 or other non-transitory computer readable media may be used to store program code that is executable by CPU 1002. The processing system 1000 may further include, if desired or needed, a video adapter 1010 to provide connectivity to a local display 1012 and an input-output (I/O) Adapter 1014 to provide an input/output interface for one or more input/output devices 1016, such as a mouse, a keyboard, printer, tape drive, CD drive, or the like.

The processing system 1000 also includes a network interface 1018, which may be implemented using a network adaptor configured to be coupled to a wired link, such as an Ethernet cable, USB interface, or the like, and/or a wireless/cellular link for communications with a network 1020. The network interface 1018 may also comprise a suitable receiver and transmitter for wireless communications. It should be noted that the processing system 1000 may include other components. For example, the processing system 1000 may include power supplies, cables, a motherboard, removable storage media, cases, and the like. These other components, although not shown, are considered part of the processing system 1000.

Example embodiments of the present invention are summarized here. Other embodiments can also be understood from the entirety of the specification and the claims filed herein.

Example 1. A method includes generating a clock signal; generating a switching signal based on the clock signal; generating a synchronization signal having an edge transition corresponding to a predetermined phase of the switching signal; transmitting the synchronization signal to a master controller; receiving a frequency adjustment command from the master controller based on the transmitted synchronization signal; and adjusting a frequency of the clock signal based on the frequency adjustment command.

Example 2. The method of example 1, where the frequency adjustment command includes a first frequency adjustment command and a second frequency adjustment command; and adjusting the frequency of the clock signal includes increasing the frequency of the clock signal by a first predetermined amount upon receipt of the first frequency adjustment command, and decreasing the frequency of the clock signal by a second predetermined amount upon receipt of the second frequency adjustment command.

Example 3. The method of one of examples 1 or 2, further including disabling the switching signal when a command has not been received from the master controller for a first predetermined period of time.

Example 4. The method of one of examples 1 to 3, where generating the clock signal includes generating a first frequency signal using an oscillator, and dividing a frequency of the first frequency signal using a frequency divider to produce the clock signal; and adjusting the frequency of the clock signal includes modifying a division ratio of the frequency divider.

Example 5. The method of one of examples 1 to 4, further including receiving a switching timing command from the master controller indicating a switching timing of the switching signal; and adjusting a switching timing of the switching signal based on the received switching timing command.

Example 6. The method of example 5 where generating the switching signal includes generating a pulse width modulated signal; the switching timing command includes a duty cycle command; and adjusting a switching timing of the switching signal includes adjusting a duty cycle of the pulse width modulated signal based on the duty cycle command.

Example 7. The method of example 6, where the pulse width modulated signal includes a three-phase pulse width modulated signal; and the method further includes driving a motor with the three-phase pulse width modulated signal.

Example 8. The method of one of examples 1 to 7, further including: measuring a rotor position of the motor a first predetermined time delay after an edge of the clock signal or after an edge of the switching signal or after an edge of the synchronization signal; and measuring a drive current of the motor a second predetermined time delay after the edge of the clock signal or after the edge of the synchronization signal.

Example 9. The method of one of examples 1 to 8, further including generating a first trigger signal, generating the first trigger signal including delaying at least one of the clock signal, the switching signal or the synchronization signal by a first predetermined delay time.

Example 10. The method of example 9, further including generating a second trigger signal, generating the second trigger signal including delaying at least one of the clock signal, the switching signal or the synchronization signal by a second predetermined delay time.

Example 11. The method of example 10, further including: performing a first measurement upon receipt of the first trigger signal; and performing a second measurement upon receipt of the second trigger signal.

Example 12. A driver circuit includes a clock generator configured to produce a clock signal; a switch driving signal generator configured to produce a switch driving signal based on the clock signal, and a synchronization signal having a first edge synchronized to a predetermined phase of the switch driving signal; and an interface circuit configured to be coupled to an external controller that is external to the driver circuit, the interface circuit configured to transmit the synchronization signal to the external controller and to adjust a frequency of the clock signal based on a frequency adjustment command received from the external controller.

Example 13. The driver circuit of example 12, where the interface circuit is further configured to disable the switch driving signal generator when the interface circuit has not received a command from the external controller for a first predetermined period of time.

Example 14. The driver circuit of one of examples 12 or 13, where the interface circuit is further configured to increase the frequency of the clock signal upon receiving a first command from the external controller, and decrease the frequency of the clock signal upon receiving a second command from the external controller.

Example 15. The driver circuit of one of examples 12 to 14, where the switch driving signal is a pulse width modulated signal; and the interface circuit is further configured to receive a duty cycle command from the external controller and to adjust a duty cycle of the pulse width modulated signal based on the received duty cycle command.

Example 16. The driver circuit of one of examples 12 to 15, where the clock generator includes: an oscillator; and a programmable divider having an input coupled to the oscillator, and an output coupled to a clock output of the clock generator, where the interface circuit is further configured to adjust the frequency of the clock signal produced by the clock generator by adjusting a division ratio of the programmable divider.

Example 17. The driver circuit of example 16, where the programmable divider includes a pulse swallowing divider.

Example 18. The driver circuit of one of examples 16 and 17, where the oscillator includes an RC oscillator.

Example 19. The driver circuit of one of examples 12 to 18, further including a first delay circuit coupled to an output of the clock generator, the first delay circuit configured to delay the clock signal by a first predetermined delay to produce a first trigger signal.

Example 20. The driver circuit of example 19, further including a second delay circuit coupled to the interface circuit, the second delay circuit configured to delay the synchronization signal by a second predetermined delay to produce a second trigger signal.

Example 21. The driver circuit of example 20, further including: a first measurement circuit configured to perform a first measurement upon receipt of the first trigger signal; and a second measurement circuit configured to perform a second measurement upon receipt of the second trigger signal.

Example 22. A system includes a first slave circuit including: a clock generator including a clock signal output and a frequency control input, the clock generator configured to produce a clock signal at the clock signal output based on a signal received at the frequency control input; a drive signal generator having a clock signal input coupled to the clock signal output of the clock generator, a drive signal output configured to be coupled to a switching circuit, and a synchronization signal output configured to be coupled to a master controller, the drive signal generator configured to produce a drive signal at the drive signal output based on the clock signal, and a synchronization signal at the synchronization signal output, the synchronization signal having an edge transition corresponding to a predetermined phase of the drive signal; and a communications interface circuit including a first interface configured to be coupled to the master controller, and a second interface configured to be coupled to the frequency control input of the clock generator, the communications interface circuit configured to increase a frequency of the clock signal via the frequency control input after receiving a first command from the master controller, and decrease a frequency of the clock signal via the frequency control input after receiving a second command from the master controller.

Example 23. The system of example 22, further including the master controller, where: the master controller includes a timing analysis circuit having a first input coupled to the synchronization signal output of the first slave circuit and a first output coupled to the first interface of the communications interface circuit of the first slave circuit; the timing analysis circuit is configured to perform a first comparison of a timing of a signal at the first input of the timing analysis circuit with a timing of a reference timing signal; and the timing analysis circuit is configured to produce the first command and the second command at the first output based on the first comparison.

Example 24. The system of example 23, where the master controller is configured to disable the switching circuit when the signal at the first input of the timing analysis circuit is not received for a predetermined period of time.

Example 25. The system of one of examples 23 or 24, where the timing analysis circuit further includes a second input configured to be coupled to a synchronization signal output of a second slave circuit and a second output configured to be coupled to a first interface of a communications interface circuit of the second slave circuit; the timing analysis circuit is further configured to perform a second comparison of a timing of a signal at the second input of the timing analysis circuit with the timing of the reference timing signal; and the timing analysis circuit is further configured to generate the first command and the second command at the second output based on the second comparison.

Example 26. The system of example 25, where the timing analysis circuit further includes: a first timing difference measurement circuit having a first input coupled to the synchronization signal output of the first slave circuit and a second input coupled to the reference timing signal, where the first timing difference measurement circuit is configured to measure a timing difference between the synchronization signal at the synchronization signal output of the first slave circuit and the reference timing signal; a second timing difference measurement circuit having a first input configured to be coupled to the synchronization signal output of the second slave circuit and a second input coupled to the reference timing signal, where the second timing difference measurement circuit is configured to measure a timing difference between the synchronization signal at the synchronization signal output of the second slave circuit and the reference timing signal; and a command generation circuit configured to produce the first command and the second command at the first output based on an output of the first timing difference measurement circuit, and produce the first command and the second command at the second output based on an output of the second timing difference measurement circuit.

Example 27. The system of example 26, where the first timing difference measurement circuit includes a first phase detector, and the second timing difference measurement circuit includes a second phase detector.

Example 28. The system of one of examples 25 to 27, further including the second slave circuit.

Example 29. The system of example 28, where: the first slave circuit is configured to control a first motor via the switching circuit; and the second slave circuit is configured to control a second motor via a further switching circuit.

Example 30. The system of example 29, where the first slave circuit is configured to control a first set of motor windings via the switching circuit; and the second slave circuit is configured to control a second set of motor windings via a further switching circuit.

Example 31. The system of example 30, further including: the switching circuit and the further switching circuit; the first motor coupled to the switching circuit and the second motor coupled to the further switching circuit; and a power supply circuit having a control input coupled to the master controller, a first power output coupled to the switching circuit and a second power output coupled to the further switching circuit.

Example 32. The system of example 31, where the master controller is configured to: disable the first power output of the power supply circuit when the signal at the first input of the timing analysis circuit is not received within a first predetermined period of time; and disable the second power output of the power supply circuit when the signal at the second input of the timing analysis circuit is not received within a second predetermined period of time.

Example 33. The system of one of examples 22 to 32, where the drive signal includes a pulse width modulated signal; and the switching circuit includes a motor inverter configured to be coupled to a motor.

Example 34. The system of one of examples 22 to 33, further including the master controller, where the first slave circuit is configured to transmit the synchronization signal to the master controller and the master controller is configured to transmit the first command and the second command to the first slave circuit using a serial peripheral interface communication protocol.

Example 35. The system of one of examples 22 to 34, further including a delay circuit having an input coupled to at least one of the clock signal output, the drive signal output, or the synchronization signal output, the delay circuit configured to provide a predetermined delay; and a measurement circuit having a trigger input coupled to an output of the delay circuit, the measurement circuit configured to perform a measurement upon receipt of a trigger signal at the trigger input.

Example 36. The system of example 35, where the first slave circuit is configured to control a motor via the switching circuit; and the measurement circuit is configured to measure at least one of a rotor position of the motor or a drive current of the motor.

Advantages of embodiments of the present invention include the ability to synchronize the control of a plurality of motors such that the currents being delivered to each motor does not overlap each other. This reduces peak current levels and allows for a common power supply to be used to supply power to the motors. Such a common power supply may have a peak rated current that is lower than the combined current of the plurality of motors in some embodiments. A further advantage of embodiments is the ability for a master controller and a plurality of slave motor controllers to independently monitor for system faults based on received commands. If either the master controller or the slave controller determines that a system fault has occurred, one or more motors can be quickly disabled.

A further advantage of embodiments includes the availability of the overall system even when one motor fails and has to be shut down.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
generating, by a slave controller, a clock signal;
generating, by the slave controller, a switching signal based on the clock signal;
generating, by the slave controller, a synchronization signal having an edge transition corresponding to a predetermined phase of the switching signal;
transmitting, by the slave controller, the synchronization signal to a master controller, wherein the master controller is external to the slave controller;
receiving, by the slave controller, a frequency adjustment command from the master controller based on the transmitted synchronization signal;
adjusting, by the slave controller, a frequency of the clock signal based on the frequency adjustment command received from the master controller, wherein:
the frequency adjustment command comprises a first frequency adjustment command and a second frequency adjustment command; and adjusting the frequency of the clock signal comprises
increasing the frequency of the clock signal by a first predetermined amount upon receipt of the first frequency adjustment command, and
decreasing the frequency of the clock signal by a second predetermined amount upon receipt of the second frequency adjustment command;
performing, by a timing analysis circuit of the master controller having a first input coupled to a synchronization signal output of the slave controller and a first output coupled to a first interface of a communications interface circuit of the slave controller, and a second input configured to be coupled to a synchronization signal output of a further slave controller and a second output configured to be coupled to a first interface of a communications interface circuit of the further slave controller, a first comparison of a timing of a signal at the first input of the timing analysis circuit with a timing of a reference timing signal,
producing, by the timing analysis circuit, the first frequency adjustment command and the second frequency adjustment command at the first output based on the first comparison,
performing, by the timing analysis circuit, a second comparison of a timing of a signal at the second input of the timing analysis circuit with the timing of the reference timing signal; and
generating, by the timing analysis circuit, the first frequency adjustment command and the second frequency adjustment command at the second output based on the second comparison.

2. The method of claim 1, further comprising disabling, by the slave controller, the switching signal when a command has not been received from the master controller for a first predetermined period of time.

3. The method of claim 1, wherein:
generating the clock signal comprises generating a first frequency signal using an oscillator, and dividing a frequency of the first frequency signal using a frequency divider to produce the clock signal; and
adjusting the frequency of the clock signal comprises modifying a division ratio of the frequency divider.

4. The method of claim 1, further comprising:
receiving a switching timing command from the master controller indicating a switching timing of the switching signal; and
adjusting a switching timing of the switching signal based on the received switching timing command.

5. The method of claim 4, wherein:
generating the switching signal comprises generating a pulse width modulated signal;
the switching timing command comprises a duty cycle command; and
adjusting a switching timing of the switching signal comprises adjusting a duty cycle of the pulse width modulated signal based on the duty cycle command.

6. The method of claim 5, wherein:
the pulse width modulated signal comprises a three-phase pulse width modulated signal; and
the method further comprises driving a motor with the three-phase pulse width modulated signal.

7. The method of claim 6, further comprising:
measuring a rotor position of the motor a first predetermined time delay after an edge of the clock signal or after an edge of the switching signal or after an edge of the synchronization signal; and
measuring a drive current of the motor a second predetermined time delay after the edge of the clock signal or after the edge of the synchronization signal.

8. The method of claim 1, further comprising generating a first trigger signal, generating the first trigger signal comprising delaying at least one of the clock signal, the switching signal or the synchronization signal by a first predetermined delay time.

9. The method of claim 8, further comprising generating a second trigger signal, generating the second trigger signal comprising delaying at least one of the clock signal, the switching signal or the synchronization signal by a second predetermined delay time.

10. The method of claim 9, further comprising:
performing a first measurement upon receipt of the first trigger signal; and
performing a second measurement upon receipt of the second trigger signal.

11. The method of claim 1, wherein the steps of transmitting the synchronization signal, and adjusting the frequency of the clock signal is performed by an interface circuit.

12. A system comprising:
a first slave circuit comprising:
a clock generator comprising a clock signal output and a frequency control input, the clock generator configured to produce a clock signal at the clock signal output based on a signal received at the frequency control input;
a drive signal generator having a clock signal input coupled to the clock signal output of the clock generator, a drive signal output configured to be coupled to a switching circuit, and a synchronization signal output configured to be coupled to a master controller external to the first slave circuit, the drive signal generator configured to produce a drive signal at the drive signal output based on the clock signal, and a synchronization signal at the synchronization signal output, the synchronization signal having an edge transition corresponding to a predetermined phase of the drive signal; and
a communications interface circuit comprising a first interface configured to be coupled to the master controller, and a second interface configured to be coupled to the frequency control input of the clock generator, the communications interface circuit configured to
increase a frequency of the clock signal via the frequency control input after receiving a first command from the master controller based on the synchronization signal, and
decrease a frequency of the clock signal via the frequency control input after receiving a second command from the master controller based on the synchronization signal, wherein:
the master controller comprises a timing analysis circuit having a first input coupled to the synchronization signal output of the first slave circuit and a first output coupled to the first interface of the communications interface circuit of the first slave circuit,
the timing analysis circuit is configured to perform a first comparison of a timing of a signal at the first input of the timing analysis circuit with a timing of a reference timing signal,
the timing analysis circuit is configured to produce the first command and the second command at the first output based on the first comparison,
the timing analysis circuit further comprises a second input configured to be coupled to a synchronization signal output of a second slave circuit and a second output configured to be coupled to a first interface of a communications interface circuit of the second slave circuit;
the timing analysis circuit is further configured to perform a second comparison of a timing of a signal at the second input of the timing analysis circuit with the timing of the reference timing signal; and
the timing analysis circuit is further configured to generate the first command and the second command at the second output based on the second comparison.

13. The system of claim 12, wherein the master controller is configured to disable the switching circuit when the signal at the first input of the timing analysis circuit is not received for a predetermined period of time.

14. The system of claim 12, wherein the timing analysis circuit further comprises:
a first timing difference measurement circuit having a first input coupled to the synchronization signal output of the first slave circuit and a second input coupled to the reference timing signal, wherein the first timing difference measurement circuit is configured to measure a timing difference between the synchronization signal at the synchronization signal output of the first slave circuit and the reference timing signal;
a second timing difference measurement circuit having a first input configured to be coupled to the synchronization signal output of the second slave circuit and a second input coupled to the reference timing signal, wherein the second timing difference measurement circuit is configured to measure a timing difference between the synchronization signal at the synchronization signal output of the second slave circuit and the reference timing signal; and
a command generation circuit configured to produce the first command and the second command at the first output based on an output of the first timing difference measurement circuit, and produce the first command and the second command at the second output based on an output of the second timing difference measurement circuit.

15. The system of claim 14, wherein the first timing difference measurement circuit includes a first phase detector, and the second timing difference measurement circuit includes a second phase detector.

16. The system of claim 12, further comprising the second slave circuit.

17. The system of claim 16, wherein:
the first slave circuit is configured to control a first motor via the switching circuit; and
the second slave circuit is configured to control a second motor via a further switching circuit.

18. The system of claim 17, wherein:
the first slave circuit is configured to control a first set of motor windings via the switching circuit; and
the second slave circuit is configured to control a second set of motor windings via the further switching circuit.

19. The system of claim 17, further comprising:
the switching circuit and the further switching circuit;
the first motor coupled to the switching circuit and the second motor coupled to the further switching circuit; and
a power supply circuit having a control input coupled to the master controller, a first power output coupled to the switching circuit and a second power output coupled to the further switching circuit.

20. The system of claim 19, wherein the master controller is configured to:
disable the first power output of the power supply circuit when the signal at the first input of the timing analysis circuit is not received within a first predetermined period of time; and
disable the second power output of the power supply circuit when the signal at the second input of the timing analysis circuit is not received within a second predetermined period of time.

21. The system of claim 12, wherein:
the drive signal comprises a pulse width modulated signal; and
the switching circuit comprises a motor inverter configured to be coupled to a motor.

22. The system of claim 12, further comprising the master controller, wherein the first slave circuit is configured to transmit the synchronization signal to the master controller and the master controller is configured to transmit the first command and the second command to the first slave circuit using a serial peripheral interface communication protocol.

23. The system of claim 12, further comprising:
a delay circuit having an input coupled to at least one of the clock signal output, the drive signal output, or the synchronization signal output, the delay circuit configured to provide a predetermined delay; and
a measurement circuit having a trigger input coupled to an output of the delay circuit, the measurement circuit configured to perform a measurement upon receipt of a trigger signal at the trigger input.

24. The system of claim 23, wherein:
the first slave circuit is configured to control a motor via the switching circuit; and
the measurement circuit is configured to measure at least one of a rotor position of the motor or a drive current of the motor.

* * * * *